United States Patent
Yano et al.

(10) Patent No.: US 9,389,824 B2
(45) Date of Patent: Jul. 12, 2016

(54) PRINTING SYSTEM, CONTROL METHOD THEREFOR, AND PHOTO-DIRECT PRINTING APPARATUS

(71) Applicant: CANON KABUSHIKI KAISHA, Tokyo (JP)

(72) Inventors: Kentaro Yano, Kanagawa (JP); Kazuya Sakamoto, Kanagawa (JP); Takao Aichi, Tokyo (JP); Fumihiro Goto, Kanagawa (JP); Akitoshi Yamada, Kanagawa (JP); Tatsuya Tanaka, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/761,459

(22) Filed: Feb. 7, 2013

(65) Prior Publication Data

US 2013/0148166 A1 Jun. 13, 2013

Related U.S. Application Data

(63) Continuation of application No. 13/473,883, filed on May 17, 2012, now Pat. No. 8,395,802, which is a continuation of application No. 13/012,114, filed on Jan. 24, 2011, now Pat. No. 8,203,741, which is a continuation of application No. 10/449,084, filed on Jun. 2, 2003, now Pat. No. 8,174,711.

(30) Foreign Application Priority Data

Jun. 4, 2002 (JP) .................... 2002-163431
May 28, 2003 (JP) .................... 2003-151231

(51) Int. Cl.
G06F 3/12 (2006.01)
H04N 1/00 (2006.01)
(Continued)

(52) U.S. Cl.
CPC ............ *G06F 3/1293* (2013.01); *H04N 1/00278* (2013.01); *H04N 1/00973* (2013.01);
(Continued)

(58) Field of Classification Search
CPC combination set(s) only.
See application file for complete search history.

(56) References Cited

U.S. PATENT DOCUMENTS 4,433,925 A 2/1984 Fujiwara et al.
5,488,558 A 1/1996 Ohki
(Continued)

FOREIGN PATENT DOCUMENTS

EP 0859326 A2 8/1998
EP 0881817 A2 12/1998
(Continued)

OTHER PUBLICATIONS

"Digital Photo Solutions for Imaging Devices," Camera & Imaging Products Association, pp. 1-5 (Feb. 2003).
(Continued)

*Primary Examiner* — Hilina K Demeter
(74) *Attorney, Agent, or Firm* — Fitzpatrick, Cella, Harper & Scinto

(57) ABSTRACT

In a printing system in which a digital camera (DSC) and PD printer apparatus are directly connected via a USB, and image data is transmitted from the DSC to the PD printer apparatus and printed, Capability of the PD printer apparatus is transmitted from the PD printer apparatus to the DSC after communication procedures are established by an application (NCDP) installed in the PD printer apparatus and DSC. The PD printer apparatus is caused to execute print operation in accordance with print conditions set by the DSC on the basis of the transmitted Capability.

24 Claims, 29 Drawing Sheets

(51) Int. Cl.
*H04N 1/333* (2006.01)
*H04N 101/00* (2006.01)

(52) U.S. Cl.
CPC ....... *H04N1/33315* (2013.01); *H04N 1/33376* (2013.01); *H04N 2101/00* (2013.01); *H04N 2201/0015* (2013.01); *H04N 2201/0041* (2013.01); *H04N 2201/0049* (2013.01); *H04N 2201/0074* (2013.01); *H04N 2201/0084* (2013.01); *H04N 2201/3204* (2013.01); *H04N 2201/3278* (2013.01); *H04N 2201/33321* (2013.01); *H04N 2201/33328* (2013.01); *H04N 2201/33335* (2013.01)

(56) References Cited

U.S. PATENT DOCUMENTS

| | | |
|---|---|---|
| 5,793,366 A | 8/1998 | Mano et al. |
| 5,967,676 A | 10/1999 | Cutler et al. |
| 6,104,886 A | 8/2000 | Suzuki et al. |
| 6,115,137 A * | 9/2000 | Ozawa et al. ............... 358/1.6 |
| 6,120,129 A | 9/2000 | Iwasaki et al. |
| 6,145,950 A | 11/2000 | Ohtsuka et al. |
| 6,166,826 A | 12/2000 | Yokoyama |
| 6,236,486 B1 | 5/2001 | Nocker, IV |
| 6,298,405 B1 | 10/2001 | Ito et al. |
| 6,394,571 B1 | 5/2002 | Yano et al. |
| 6,469,770 B2 | 10/2002 | Hoshino et al. |
| 6,513,073 B1 | 1/2003 | Kawai et al. |
| 6,535,298 B2 | 3/2003 | Winter et al. |
| 6,552,743 B1 | 4/2003 | Rissman |
| 6,559,963 B1 | 5/2003 | Kamimura |
| 6,559,971 B1 | 5/2003 | Watts et al. |
| 6,577,338 B1 | 6/2003 | Tanaka et al. |
| 6,618,553 B1 | 9/2003 | Shiohara |
| 6,711,637 B2 | 3/2004 | Tateyama |
| 6,753,903 B1 | 6/2004 | Lin |
| 6,774,933 B1 | 8/2004 | Suzuki |
| 6,806,978 B1 | 10/2004 | Tamura et al. |
| 6,819,442 B2 | 11/2004 | Takahashi |
| 6,850,270 B1 | 2/2005 | Suzuki |
| 6,860,578 B2 | 3/2005 | Yamada et al. |
| 6,914,687 B1 | 7/2005 | Hosoda et al. |
| 6,914,698 B1 | 7/2005 | Hunter |
| 6,922,258 B2 | 7/2005 | Pineau |
| 6,930,796 B1 | 8/2005 | Matsuura et al. |
| 6,965,404 B2 | 11/2005 | Hosoda et al. |
| 7,034,880 B1 * | 4/2006 | Endsley ............ H04N 1/00132 348/207.1 |
| 7,038,714 B1 | 5/2006 | Parulski et al. |
| 7,062,579 B2 | 6/2006 | Tateyama et al. |
| 7,072,063 B2 | 7/2006 | Moriyama et al. |
| 7,076,550 B1 | 7/2006 | Noguchi et al. |
| 7,107,516 B1 | 9/2006 | Anderson et al. |
| 7,142,318 B2 | 11/2006 | Lopez et al. |
| 7,170,857 B2 | 1/2007 | Stephens et al. ............... 370/230 |
| 7,191,236 B2 | 3/2007 | Simpson-Young et al. |
| 7,199,895 B2 | 4/2007 | Collier et al. ................ 358/1.15 |
| 7,327,387 B2 | 2/2008 | Tanaka et al. |
| 7,375,845 B2 | 5/2008 | Shiota et al. |
| 7,414,746 B2 | 8/2008 | Tanaka et al. |
| 7,684,438 B2 | 3/2010 | Stephens et al. ............... 370/466 |
| 7,773,244 B2 | 8/2010 | Yano et al. |
| 8,340,024 B2 | 12/2012 | Stephens et al. ............... 370/328 |
| 9,019,876 B2 | 4/2015 | Stephens et al. ...... H04W 4/008 |
| 9,072,090 B2 | 6/2015 | Segev et al. ......... H04W 72/042 |
| 2001/0013949 A1 * | 8/2001 | Tateyama ............. 358/1.16 |
| 2001/0030692 A1 * | 10/2001 | Yoneda ............ 348/207 |
| 2001/0048534 A1 * | 12/2001 | Tanaka et al. ............... 358/1.16 |
| 2002/0027673 A1 * | 3/2002 | Roosen ............. H04N 1/00204 358/1.13 |
| 2002/0029277 A1 | 3/2002 | Simpson-Young et al. |
| 2002/0051201 A1 | 5/2002 | Winter et al. |
| 2002/0059482 A1 | 5/2002 | Ashizaki et al. |
| 2002/0089531 A1 | 7/2002 | Hirasawa |
| 2002/0167592 A1 | 11/2002 | Toyoda et al. |
| 2002/0171857 A1 | 11/2002 | Hisatomi et al. |
| 2003/0020945 A1 | 1/2003 | Lopez et al. |
| 2003/0095524 A1 | 5/2003 | Stephens et al. ............... 370/338 |
| 2003/0158979 A1 | 8/2003 | Tateyama et al. |
| 2003/0206316 A1 | 11/2003 | Anderson et al. |
| 2003/0222985 A1 | 12/2003 | Goto et al. |
| 2003/0231341 A1 | 12/2003 | Aichi et al. |
| 2004/0032618 A1 | 2/2004 | Yano et al. |
| 2004/0145769 A1 | 7/2004 | Collier et al. ................ 358/1.15 |
| 2004/0167974 A1 | 8/2004 | Bunn et al. ............... 709/223 |
| 2004/0207875 A1 | 10/2004 | Endo |
| 2004/0218209 A1 * | 11/2004 | Hamaguchi ............. H04L 67/02 358/1.15 |
| 2006/0078230 A1 | 4/2006 | Kimura |
| 2007/0013781 A1 | 1/2007 | Kageyama et al. |
| 2007/0115819 A1 | 5/2007 | Stephens et al. ............... 370/230 |
| 2010/0183025 A1 | 7/2010 | Stephens et al. ............... 370/466 |
| 2013/0107320 A1 * | 5/2013 | Vidyanand ............. G06F 3/1204 358/1.15 |
| 2013/0137374 A1 | 5/2013 | Stephens et al. ...... H04W 4/008 |

FOREIGN PATENT DOCUMENTS

| | | |
|---|---|---|
| EP | 0883276 A2 | 12/1998 |
| EP | 0920184 A2 | 6/1999 |
| EP | 1 130 895 A1 | 9/2001 |
| EP | 1 186 989 A2 | 3/2002 |
| JP | 7288621 A | 10/1995 |
| JP | 9223096 A | 8/1997 |
| JP | 10173833 A | 6/1998 |
| JP | 10200766 A | 7/1998 |
| JP | 10240460 A | 9/1998 |
| JP | 10271370 A | 10/1998 |
| JP | 10285246 A | 10/1998 |
| JP | 10341327 A | 12/1998 |
| JP | 11249840 A | 9/1999 |
| JP | 2000035864 A | 2/2000 |
| JP | 2000118086 A | 4/2000 |
| JP | 2000151883 A | 5/2000 |
| JP | 2000318270 A | 11/2000 |
| JP | 2001290612 A | 10/2001 |
| JP | 2001298694 A | 10/2001 |
| JP | 2002044344 A | 2/2002 |
| JP | 2002055896 A | 2/2002 |
| JP | 2002086853 A | 3/2002 |
| JP | 2002091841 A | 3/2002 |
| JP | 2002095071 A | 3/2002 |
| JP | 2002111947 A | 4/2002 |
| JP | 2004013349 A | 1/2004 |
| WO | 9750243 A1 | 12/1997 |
| WO | 0137101 A1 | 5/2001 |
| WO | 0203133 A2 | 1/2002 |

OTHER PUBLICATIONS

Hayashi, "Instruction Manual for Applications", MAC Power, ASCII Corporation, vol. 13, No. 2, pp. 130-131, Feb. 1, 2002.
Office Action—European Patent Appln. No. 034253487.7-1522, European Patent Office, Mar. 9, 2011.
Brief Communication—European Patent Appln. No. 03253487.7-1502, European Patent Office, Sep. 18, 2014.
Photographic and Imaging Manufacturers Association, Inc., "Photography—Electronic Still Picture Imaging—Picture Transfer Protocol (PTP) for Digital Still Photography Devices", pp. i-xii, 1-8, 15-17, 37-46, 49, 50, 87, 88, 93, 112, 113, Jul. 5, 2000.
U.S. Appl. No. 14/102,779; Notice of Allowance dated Oct. 13, 2015.

* cited by examiner

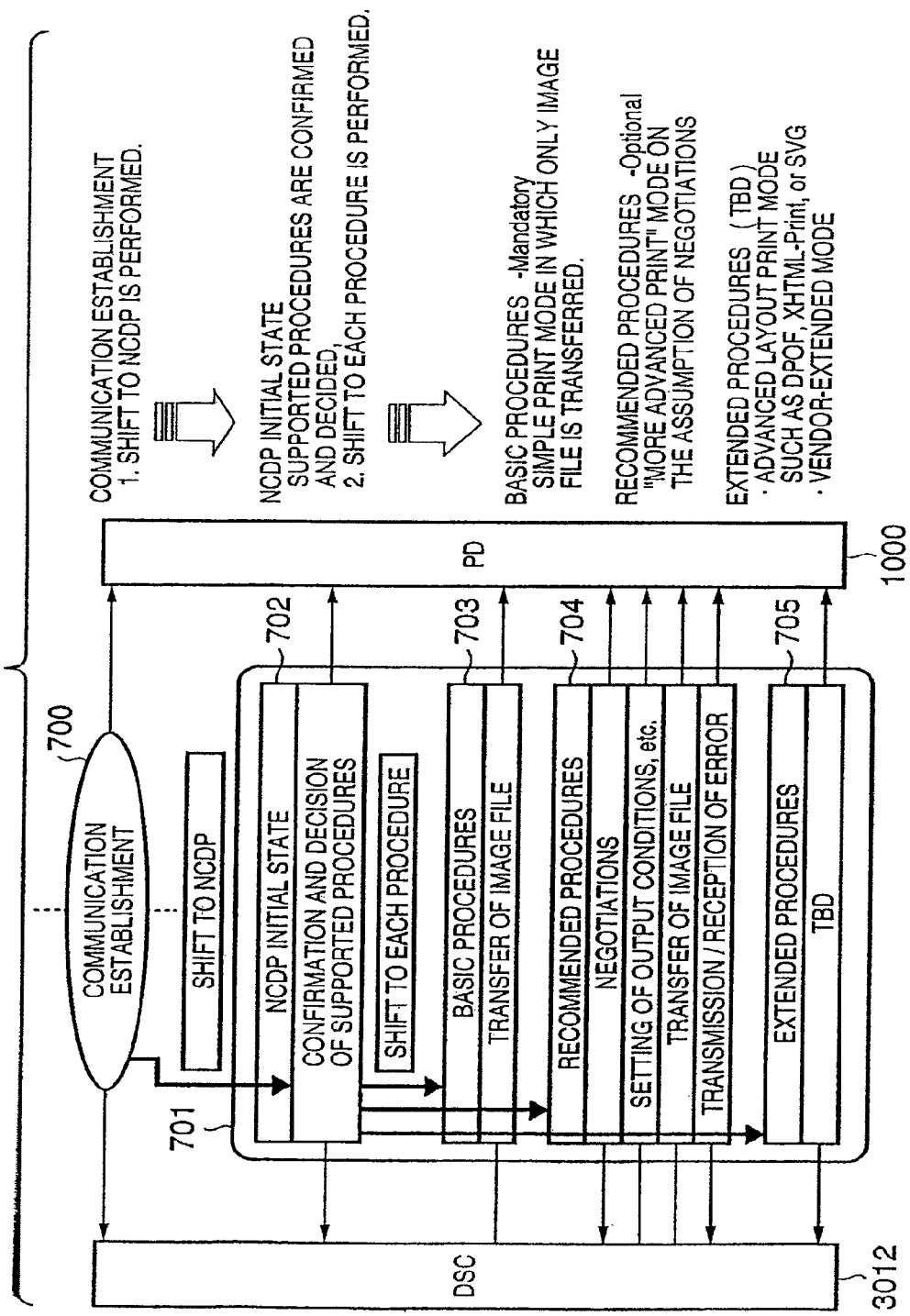

FIG. 8

| ISSUING SOURCE | FUNCTION NAME | CORRESPONDING MODE | | | FUNCTION |
| --- | --- | --- | --- | --- | --- |
| | | BASIC | RECOMMENDED | EXTENDED | |
| PRINTER | NCDPStart | ○ | ○ | ○ | SHIFT TO NCDP |
| | ProcedureStart | ○ | ○ | ○ | SHIFT TO EACH MODE (BASIC, RECOMMENDED, OR EXTENDED) |
| | NCDPEnd | ○ | ○ | ○ | TERMINATION FROM NCDP |
| | Capability | | ○ | | NOTIFICATION OF PRINTER FUNCTION (WHEN NEGOTIATION IS NECESSARY) |
| | GetImage | ○ | ○ | | ACQUISITION OF IMAGE SUCH AS JPEG FROM DSC |
| | StatusSend | | ○ | | NOTIFICATION OF ERROR STATE (WARNING OR FATAL ERROR) |
| | PageStart | | ○ | | NOTIFICATION OF START OF PRINTING (SHEET FEED FOR EACH PAGE) |
| | PageEnd | | ○ | | NOTIFICATION OF END OF PRINTING (DISCHARGE SHEET FOR EACH PAGE) |
| | JobEnd | | ○ | | NOTIFICATION OF END OF PRINT JOB |
| DSC | JobStart | ○ | ○ | | PRINT INSTRUCTION |
| | JobAbort | | ○ | | PRINT ABORT INSTRUCTION |
| | JobContinue | | ○ | | PRINT RESTART INSTRUCTION |

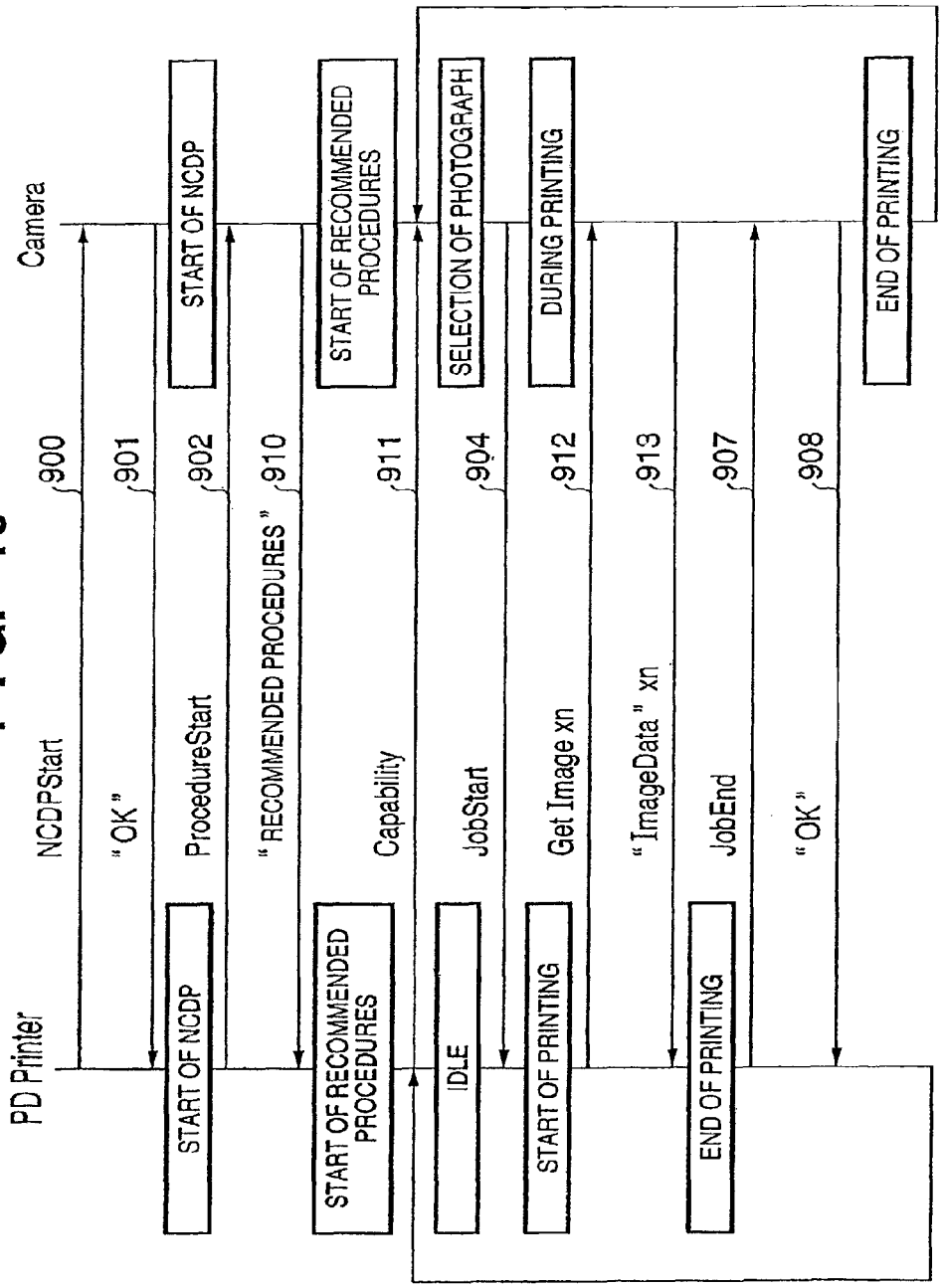

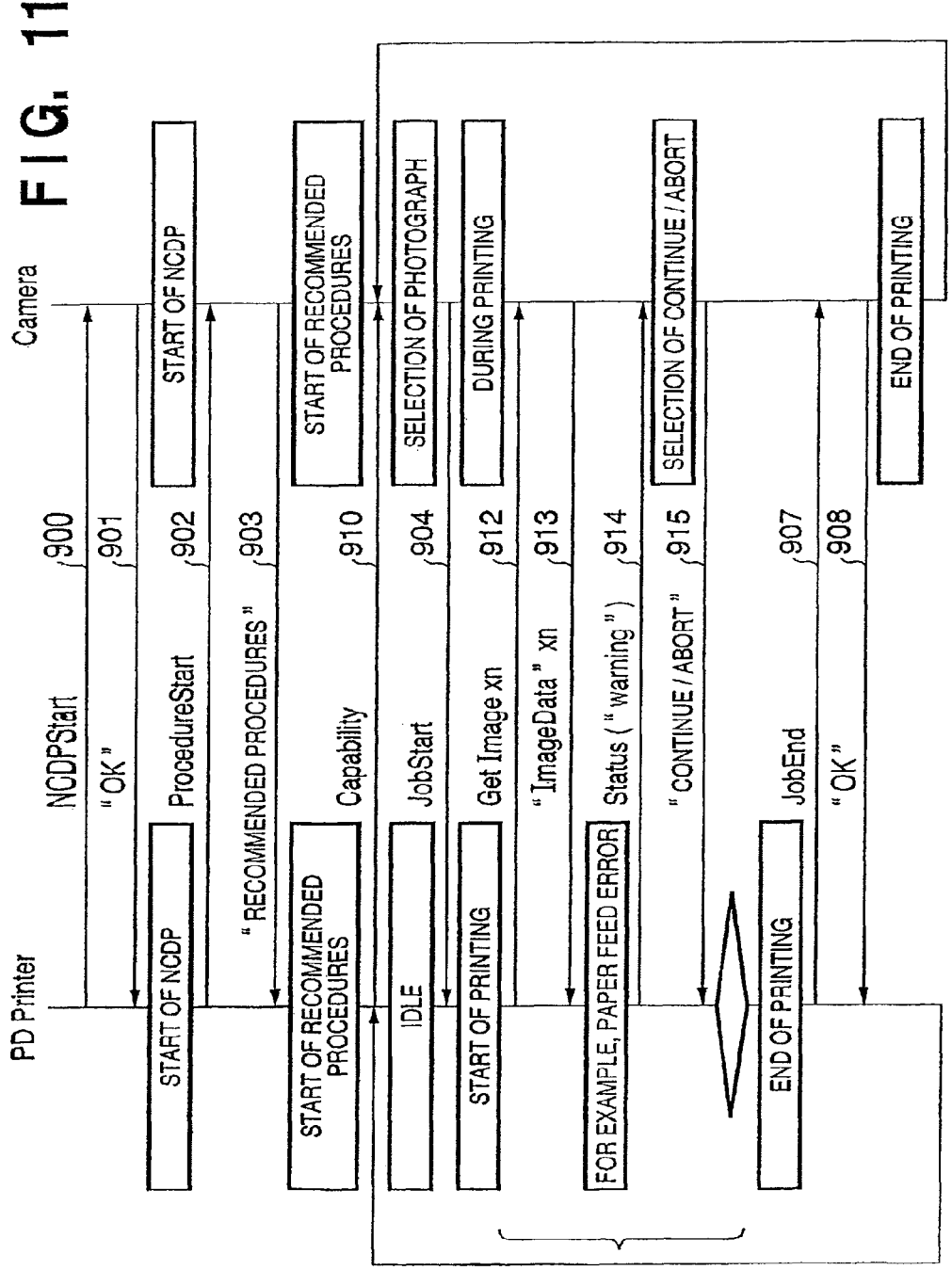

FIG. 12

```
<CAPABILITY>
ITEMS WHICH DO NOT REQUIRE NEGOTIATIONS.
  <Quality=Draft, Normal, Fine>
  <PaperSize=L, 2L,Card,Wallet, 4x6, A4, Letter, ...>
  <PaperType=Plain, Photo>
ITEMS WHICH REQUIRE NEGOTIATIONS.
  <ImageType=Tiff, Jpeg, BMP, ...>
  <Date=On, Off>
  <FileName = On, Off>
  <Layout=PAPER SIZE / LAYOUT1, ... ,INDEX(N×M)>
  <Layout=L / Borderless,1×1; 1×2, 2×2, INDEX(3×5)>
  <Layout=2L / Borderless,1×1, 1×2, 2×2, INDEX(5×7)>
  <Layout=Card / Borderless,1×1, 1×2, INDEX(2×3)>
    ...
  <Layout=Letter / Borderless,1×1, 1×2, 2×2, 2×4, 4×4, INDEX(8×10)>
  <ImageOptimize=On, Off>
  <SizePerPicture=3MByte>
  <Option>
    <Vender=Ganon, HP, SQNY, ...>
    <ImageOptimize=DIPS, Auto, On, APP, Vivid, Off, ...>
    <Trimming=(X, Y, W, H)>
  <Option>
    ...
  <Option>
</CAPABILITY>
```

DESCRIPTION OF CAPABILITY CONTENTS

- OUTPUT QUALITY (FAST/NORMAL/FINE)
- PAPER SIZE IS DESCRIBED.
- PAPER TYPE (PLAIN PAPER/PHOTO-ONLY PAPER)

- SUPPORTED IMAGE FORMAT IS DESCRIBED.
- DATE OUTPUT ( On, Off )
- FILE NAME OUTPUT ( On, Off )
- LAYOUT WHICH CAN BE OUTPUT FOR PAPER SIZE IS DESCRIBED.

- IMAGE CORRECTION ( On, Off )
- IMAGE SIZE WHICH CAN BE OUTPUT.
- OPTION IS DESCRIBED.
- VENDOR NAME
- VENDOR-UNIQUE SPECIFICATION (IMAGE CORRECTION)
- VENDOR-UNIQUE SPECIFICATION (TRIMMING)

FIG. 25

```
<PROCEDURESTART>
 <Procedure=Basic, Recommend, Extend>
 <Option>
  <Vendor=Ganon>
  <Product=GanonPrinter>
 </Option>
</PROCEDURESTART>
```

FIG. 26

```
<PROCEDURESTART>
 <Procedure=Basic>
 <Option>
  <Vendor=SQNY>
  <Product=SQNYCamera>
 </Option>
</PROCEDURESTART>
```

F I G. 27

```
<JOBSTART>
 <Picture=00000001, 00000002, 00000003, 00000004>
</JOBSTART>
```

FIG. 28

```
<JOBSTART>
 <Quality=Normal>
 <PaperSize=L>
 <PaperType=Photo>
 <ImageType=Jpeg>
 <Date=Off>
 <FileName=Off>
 <Layout=L/1x1>
 <Picture=00000001, 00000002, 00000003, 00000004>
</JOBSTART>
```

F I G. 29

```
<JOBSTART>
 <Quality=Fine>
 <PaperSize=2L>
 <PaperType=Photo>
 <ImageType=Jpeg>
 <Date=On>
 <FileName=On>
 <Layout=2L/1x1>
 <Picture=00000001, 00000002, 00000003, 00000004>
</JOBSTART>
```

PRINTING SYSTEM, CONTROL METHOD THEREFOR, AND PHOTO-DIRECT PRINTING APPARATUS

This application is a continuation of U.S. patent application Ser. No. 13/473,883, now allowed, which is a continuation of U.S. patent application Ser. No. 13/012,114, which issued as U.S. Pat. No. 8,203,741, on Jun. 19, 2012, which is a continuation of U.S. patent application Ser. No. 10/449,084, which issued as U.S. Pat. No. 8,174,711 on May 8, 2012.

FIELD OF THE INVENTION

The present invention relates to a printing system having a printing apparatus and an image supply device such as a digital camera, a control method therefor, and a photo-direct printing apparatus.

BACKGROUND OF THE INVENTION

In recent years, digital cameras (image sensing apparatuses) capable of photographing an image by a simple operation and converting the photographed image into digital image data have widely been used. To print an image photographed by this camera and use the print as a photograph, digital image data of the photographed image is temporarily input from the digital camera to a PC (computer), and undergoes image processing by the PC. Then, the processed image data is output from the PC to a color printer, which prints the data.

To the contrary, there have been developed color print systems capable of directly transferring digital image data from a digital camera to a color printer and printing the data without the mediacy of any PC, and so-called photo-direct (PD) printers capable of directly mounting in a color printer a memory card which is mounted in a digital camera and stores a sensed image, and printing the photographed image stored in the memory card.

Especially when image data is to be directly transferred from a digital camera to a printer and printed, demands have arisen for the advent of a photo-direct printer capable coping with digital cameras of various vendors because the specifications and operating methods of digital cameras are different between vendors. Such photo-direct printer apparatus receives and prints image data not only from the above-mentioned digital camera, but also from a cell phone, PDA, and other devices. Further, the printer has various functions. The printer and device cannot predict the capabilities of the partners, and must exchange pieces of function information.

SUMMARY OF THE INVENTION

The present invention has been made in consideration of the above situation, and has as its feature to provide a printing system capable of receiving and printing image data from image supply devices of various vendors by interface-independent image data transfer and printing instruction, a control method therefor, and a photo-direct printing apparatus.

It is another feature of the present invention to provide a printing system capable of defining a standard protocol between an image supply device and a printing apparatus, and executing print processing regardless of the model or vendor, a control method therefor, and a photo-direct printing apparatus.

According to the invention, there is provided a printing system in which an image supply device and a printing apparatus are directly connected via a general-purpose interface, and image data is transmitted from the image supply device to the printing apparatus and printed, the system comprising:

transmission means for transmitting function information of the printing apparatus from the printing apparatus to the image supply device after establishing a communication procedure by an application installed in the printing apparatus and the image supply device; and means for causing the printing apparatus to execute print operation in accordance with a print condition set by the image supply device on the basis of the function information transmitted by the transmission means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 7 depicts a chart for explaining the outline of NCDP communication procedures according to the embodiment;

FIG. 8 depicts a table for explaining commands in NCDP according to the embodiment;

FIG. 10 depicts a chart for explaining print procedures by "recommended procedures" in NCDP according to the embodiment;

FIG. 11 depicts a chart for explaining print procedures when an error occurs in the "recommended procedures" in NCDP according to the embodiment;

FIG. 12 depicts a view for explaining an example of Capability transmitted in NCDP according to the embodiment;

FIG. 25 depicts a view showing an example of a script which is first sent from the printer to a DSC in a ProcedureStart command;

FIG. 26 depicts a view showing an example of a script which is sent from the DSC to the printer subsequently to script 1 in response to the ProcedureStart command;

FIG. 27 depicts a view showing example 1 of a script which is sent from the DSC to the printer in a JobStart command in the "basic procedures";

FIG. 28 depicts a view showing example 2 of a script which is sent from the DSC to the printer in the JobStart command in the "basic procedures"; and FIG. 29 depicts a view showing a script which is sent from the DSC to the printer in the JobStart command in the "recommended procedures"

DETAILED DESCRIPTION OF THE PREFERRED EMBODIMENT

A preferred embodiment of the present invention will be described in detail below with reference to the accompanying drawings.

Figure 1:
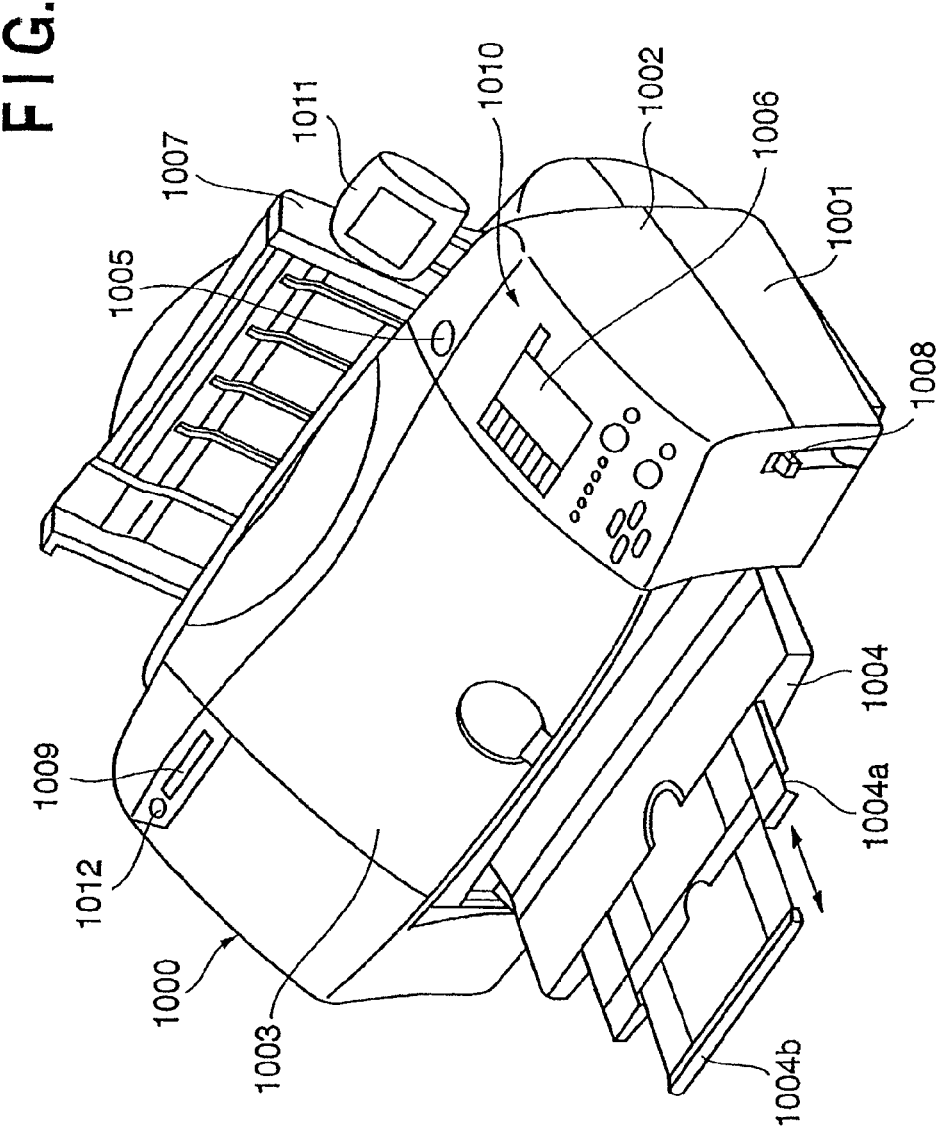
FIG. 1 depicts a schematic perspective view showing a PD printer apparatus according to an embodiment of the present invention.

FIG. 1 depicts a schematic perspective view showing a photo-direct printer apparatus (to be referred to as a PD printer apparatus hereinafter) 1000 according to the embodiment of the present invention. The PD printer apparatus 1000 has a general PC printer function of receiving data from a host computer (PC) and printing the data, and a function of directly reading and printing image data stored in a storage medium such as a memory card, or receiving image data from a digital camera and printing the data.

In FIG. 1, the main body which defines the casing of the PD printer apparatus 1000 according to the embodiment has casing members: a case M 1001, upper case 1002, access cover 1003, and discharge tray 1004. The lower case 1001 forms almost the lower half of the PD printer apparatus 1000, whereas the upper case 1002 forms almost the upper half of the main body. A combination of these cases forms a hollow structure with a storage space where each mechanism (to be described later) is stored. The upper and front surfaces have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front side to open the opening. Print sheets can be discharged from the opening, and the discharged print sheets can be sequentially stacked. The discharge tray 1004 houses two auxiliary trays 1004a and 1004b. These trays are pulled out to enlarge/reduce the paper support area in three stages, as needed.

The access cover 1003 is rotatably held at one end by the upper case 1002 so as to open/close the opening formed in the upper surface. Opening the access cover 1003 enables exchanging a print head cartridge (not shown), ink tank (not shown), or the like stored in the main body. Although not shown, a projection formed on the back surface of the access cover 1003 rotates a cover opening/closing lever when the access cover 1003 is opened/closed. The lever rotation position is detected by a microswitch or the like, thereby detecting the open/closed state of the access cover 1003.

A power key 1005 is provided on the upper surface of the upper case 1002. An operation panel 1010 having a liquid crystal display 1006, various key switches, and the like is arranged on the right side of the upper case 1002. The structure of the operation panel 1010 will be described in detail with reference to FIG. 2. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a compact flash memory, smart media, and memory stick. Reference numeral 1011 denotes a viewer (liquid crystal display) which is detachable from the main body of the PD printer apparatus 1000 and is used to display an image of one frame, an index image, and the like when images stored in the PC card are searched for an image to be printed; and numeral 1012 denotes a USB terminal for connecting a digital camera (to be described later). A USB bus connector for connecting a personal computer (PC) is attached to the back surface of the PD apparatus 1000.

Figure 2:
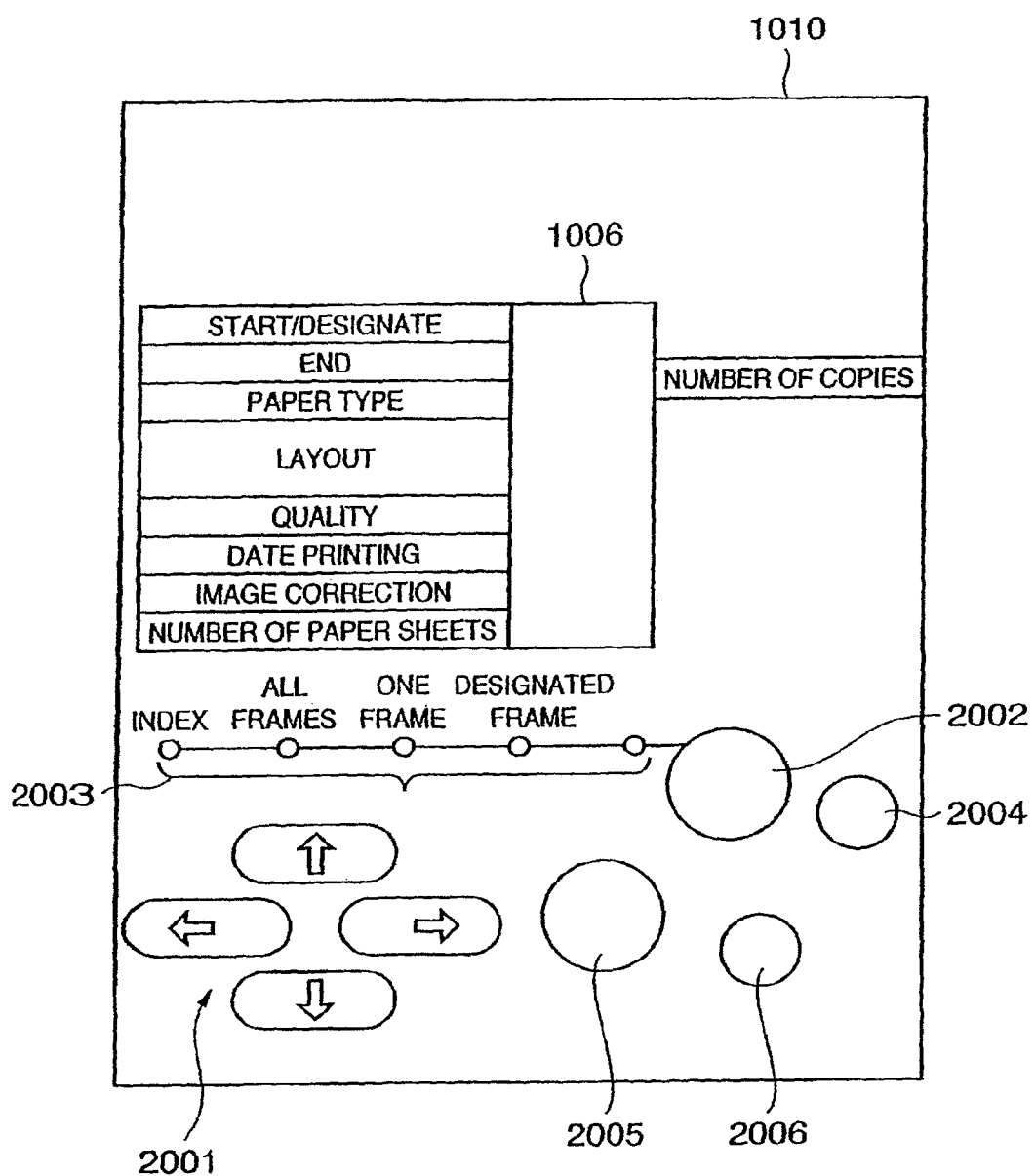
FIG. 2 depicts a schematic view showing the operation panel of the PD printer apparatus according to the embodiment.

FIG. 2 depicts a schematic view showing the operation panel 1010 of the PD printer apparatus 1000 according to the embodiment.

In FIG. 2, the liquid crystal display 1006 displays menu items for various settings of data on items printed on the right and left of the display 1006. The displayed items are, for example, the first photograph number of a print range, a designated frame number (start frame designation/print frame designation), the last photograph number of a printed range (end), the number of prints (number of copies), the type of paper (print sheet) used for printing (paper type), setting of the number of photographs to be printed on one paper sheet (layout), designation of the print quality (quality), designation whether to print a photographing date (date printing), designation whether to correct and print a photograph (image correction), and display of the number of paper sheets necessary for printing (number of paper sheets). These items are selected or designated with cursor keys 2001. Reference numeral 2002 denotes a mode key which allows switching the type of printing (index printing, printing of all frames, printing of one frame, or the like) every time the key 2002 is pressed. A corresponding one of LEDs 2003 is turned on accordingly. Reference numeral 2004 denotes a maintenance key for performing printer maintenance such as cleaning of the print head; numeral 2005 denotes a print start key which is pressed to designate the start of printing or establish maintenance setting; and numeral 2006 denotes a print stop key which is pressed to stop printing or designate to stop maintenance.

Figure 3:
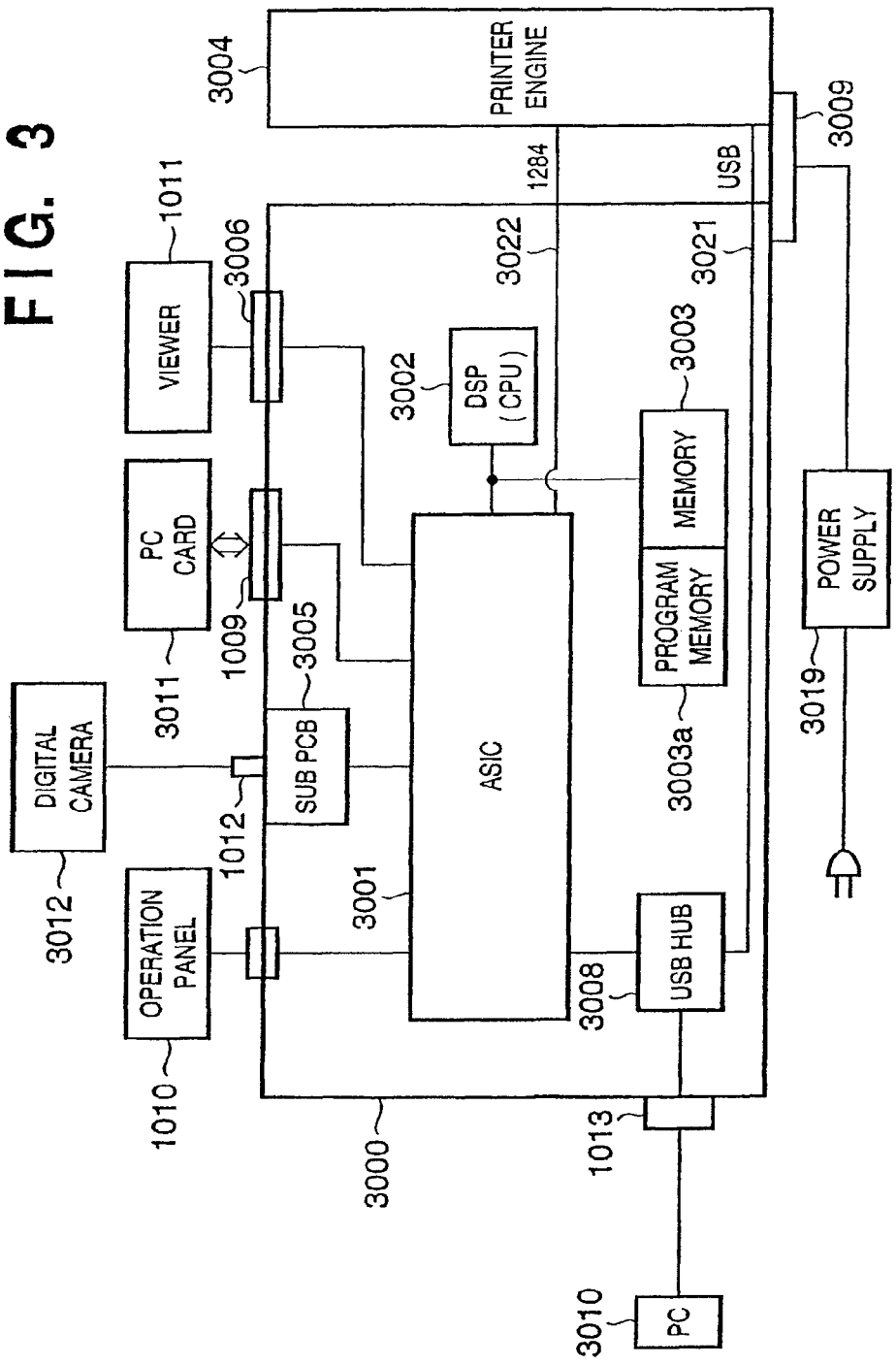
FIG. 3 is a block diagram showing the arrangement of the main part concerning control of the PD printer apparatus according to the embodiment.

The arrangement of the main part concerning control of the PD printer apparatus 1000 according to the embodiment will be explained with reference to FIG. 3. In FIG. 3, the same reference numerals as in the foregoing drawings denote the same parts, and a description thereof will be omitted.

In FIG. 3, reference numeral 3000 denotes a controller (control board); numeral 3001 denotes an ASIC (application specific LSI) whose arrangement will be described in detail below with reference to the block diagram of FIG. 4; numeral 3002 denotes a DSP (Digital Signal Processor) which incorporates a CPU and performs various control processes to be described later, and image processes such as conversion from a luminance signal (RGB) to a density signal (CMYK), scaling, gamma conversion, and error diffusion; numeral 3003 denotes a memory having a program memory 3003a which stores the control program of the CPU of the DSP 3002, a RAM area which stores a program in running, and a memory area functioning as a work memory which stores image data and the like; numeral 3004 denotes a printer engine which is an ink-jet printer type printer engine for printing a color image using a plurality of color inks in this embodiment; numeral 3005 denotes a USB connector serving as a port for connecting a digital camera (DSC) 3012; numeral 3006 denotes a connector for connecting the viewer 1011; and numeral 3008 denotes a USB bus hub which transmits data from a PC 3010 and outputs the data to the printer engine 3004 via a USB bus 3021 when the PD printer apparatus 1000 prints on the basis of image data from the PC 3010. The connected PC 3010 can directly exchange data and signals with the printer engine 3004 and execute printing (functions as a general PC printer). Reference numeral 3009 denotes a power connector which receives from a power supply 3019 a DC voltage converted from a commercial AC voltage. The PC 3010 is a general personal computer. Reference numeral 3011 denotes a memory card (PC card) described above; and 3012, the digital camera (DSC: Digital Still Camera).

Signal exchange between the controller 3000 and the printer engine 3004 is performed via the USB bus 3021 or an IEEE 1284 bus 3022.

Figure 4:
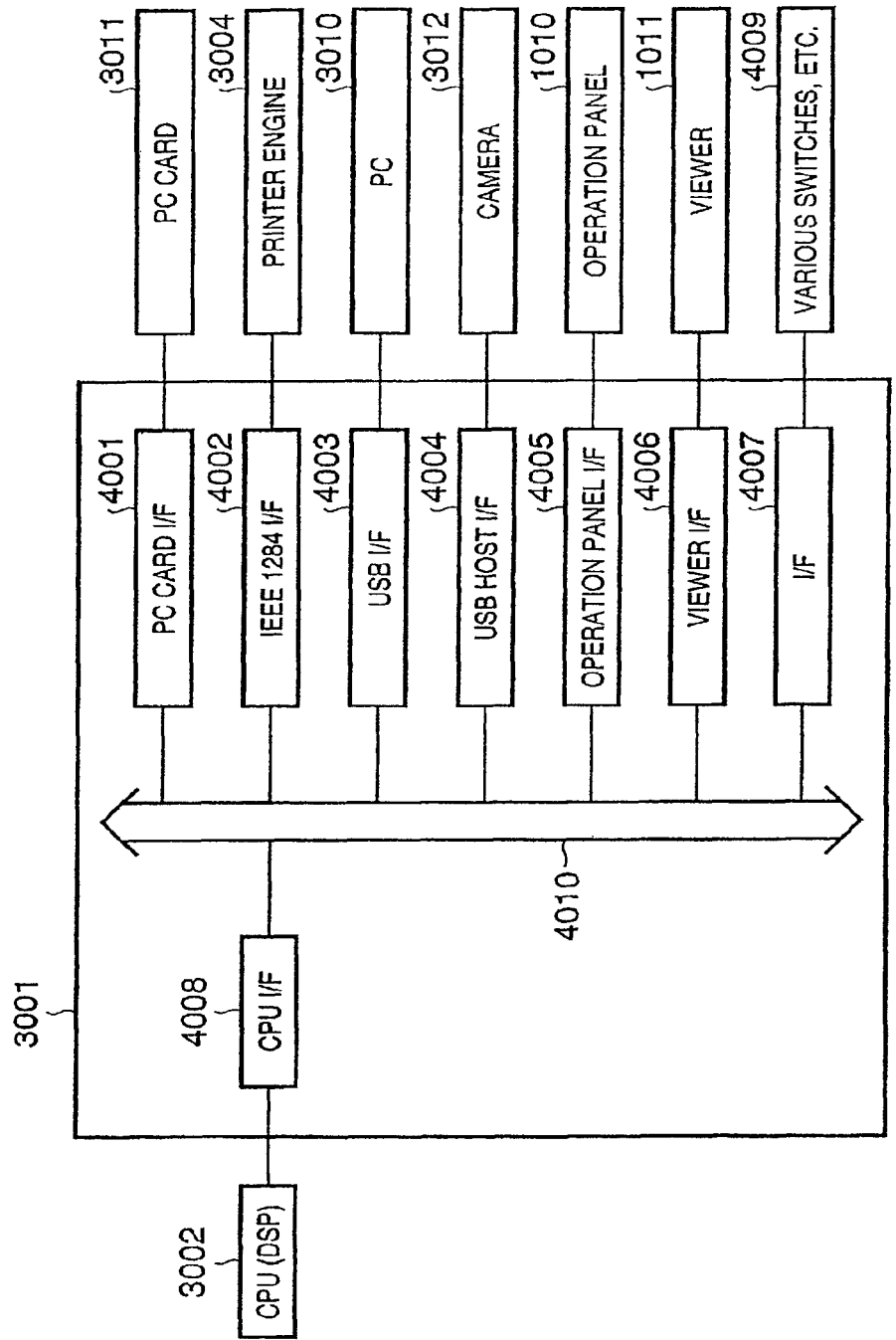
FIG. 4 is a block diagram showing the ASIC arrangement of the PD printer apparatus according to the embodiment.

FIG. 4 is a block diagram showing the arrangement of the ASIC 3001. Also in FIG. 4, the same reference numerals as in the foregoing drawings denote the same parts, and a description thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface 4002 is a bus used to print image data stored in the digital camera 3012 or PC card 3011. Reference numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface between various switches and LEDs 4009, and the like; numeral 4008 denotes a CPU interface which controls data exchange between these interfaces and the DSP 3002; and numeral 4010 denotes an internal bus (ASIC bus) which is connected to these units.

Operation with the above arrangement will be roughly described.

<General PC Printer Mode>

A general PC printer mode is a print mode in which an image is printed on the basis of print data sent from the PC 3010.

In this mode, when data from the PC 3010 is input via a USB connector 1013 (FIG. 3), the data is directly sent to the printer engine 3004 via the USB hub 3008 and USB 3021, and printing is done on the basis of the data from the PC 3010.

<Direct Print Mode From PC Card>

When the PC card 3011 is mounted in or dismounted from the card slot 1009, an interrupt occurs. The DSP 3002 can detect that the PC card 3011 has been mounted or dismounted (removed). If the PC card 3011 is mounted, compressed (e.g., JPEG-compressed) image data stored in the PC card 3011 is loaded and stored in the memory 3003. If printing of the stored image data is designated using the operation panel 1010, the compressed image data is decompressed and stored in the memory 3003. Conversion from an RGB signal into a YMCK signal, gamma correction, error diffusion, and the like are executed to convert the stored data into print data printable by the printer engine 3004. The print data is output to the printer engine 3004 via the IEEE 1284 interface 4002, and printed.

<Direct Print Mode From Camera>

Figure 5:
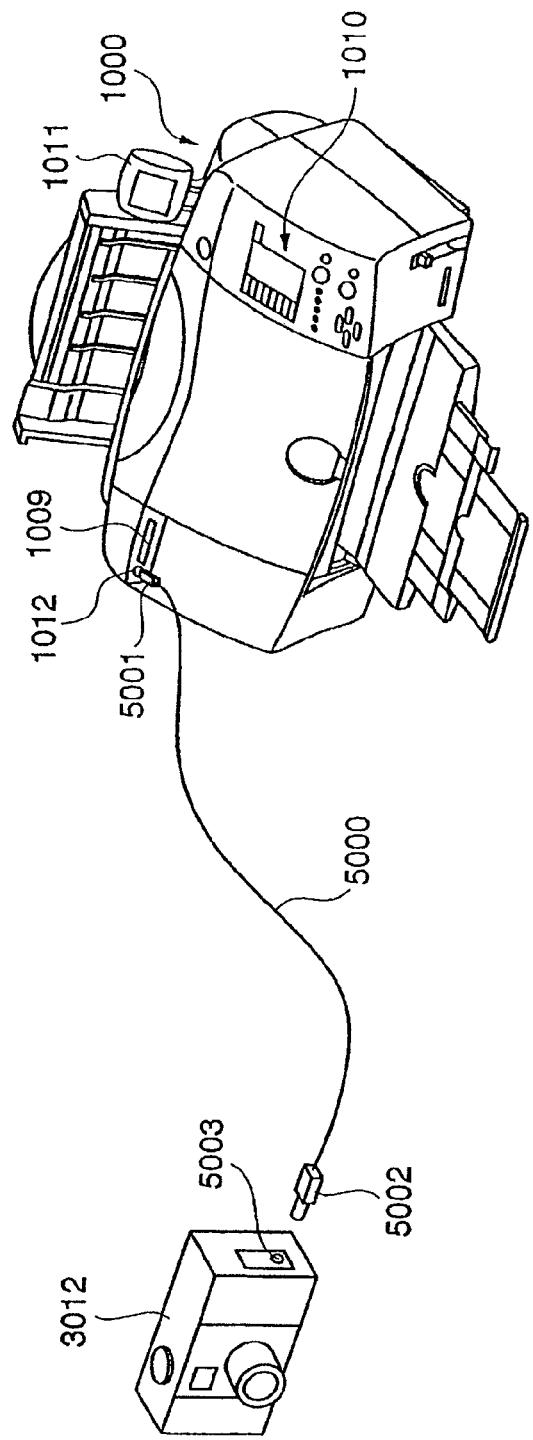
FIG. 5 depicts a view for explaining connection between the PD printer apparatus and a digital camera according to the embodiment.

FIG. 5 depicts a view for explaining connection between the PD printer apparatus 1000 and the digital camera 3012 according to the embodiment.

In FIG. 5, a cable 5000 has a connector 5001 which is connected to the connector 1012 of the PD printer apparatus 1000, and a connector 5002 which is connected to a connector 5003 of the digital camera 3012. The digital camera 3012 can output via the connector 5003 image data which is saved in an internal memory. The digital camera 3012 can take various arrangements such as an arrangement having an internal memory as a storage means, and an arrangement having a slot for mounting a removable memory. The PD printer apparatus 1000 and digital camera 3012 are connected via the cable 5000 shown in FIG. 5. Image data from the digital camera 3012 can be directly printed by the PD printer apparatus 1000.

When the digital camera 3012 is connected to the PD printer apparatus 1000, as shown in FIG. 5, the display 1006 of the operation panel 1010 displays only a camera mark. Display and operation on the operation panel 1010 become invalid, and display on the viewer 1011 also becomes invalid. After that, only key operation to the digital camera 3012 and image display on the display (not shown) of the digital camera 3012 are valid. The user can designate printing by using the digital camera 3012.

An object of the embodiment is to provide a PD printer apparatus capable of connecting digital cameras of a plurality of vendors and printing data. Protocols when the PD printer apparatus 1000 according to the embodiment and a digital camera are connected to perform printing will be explained in detail.

In the embodiment, communication control between the PD printer apparatus 1000 and the digital camera 3012 is performed using a general-purpose file and general-purpose format. This embodiment proposes NCDP (New Camera Direct Print).

Figure 6:
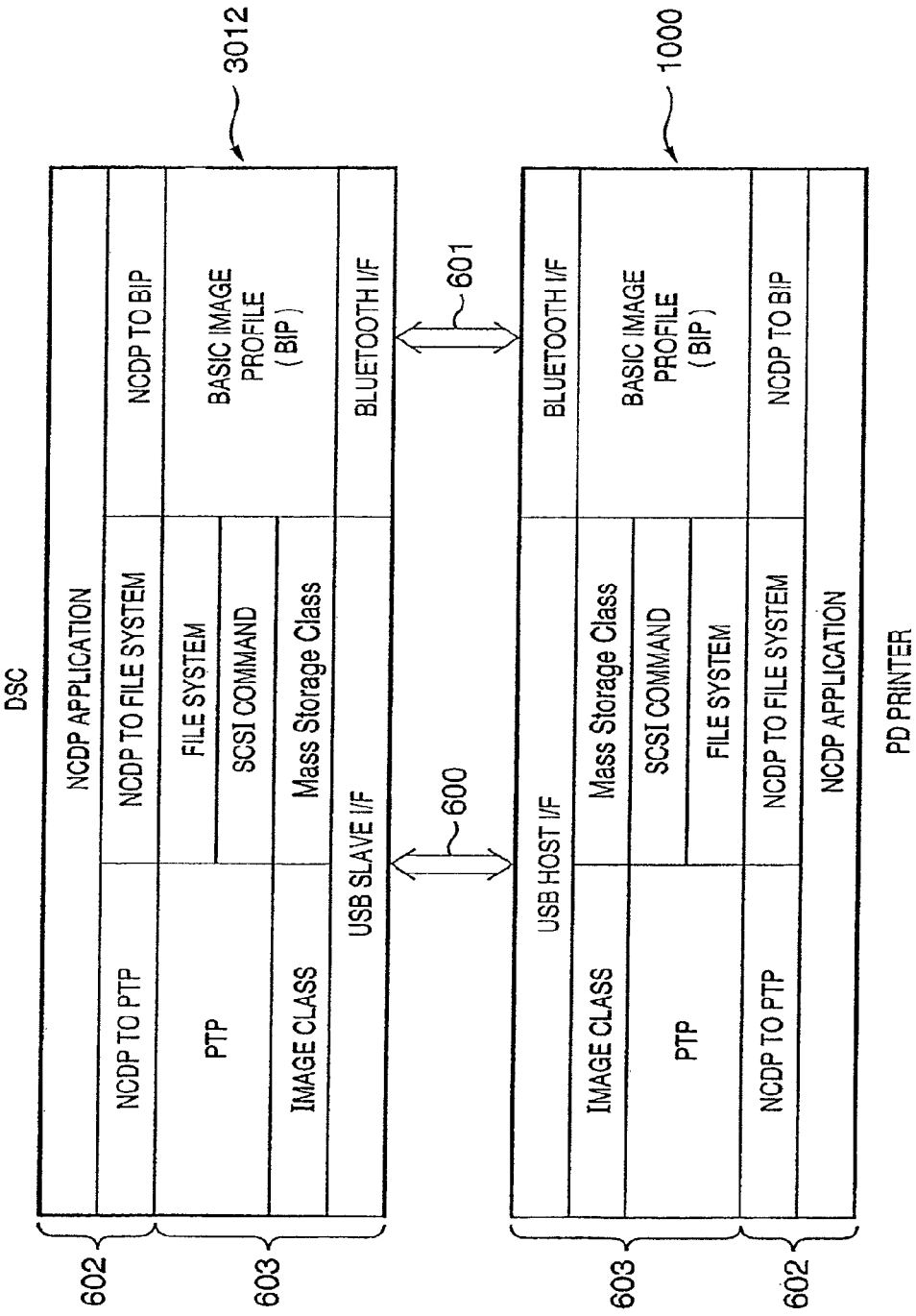
FIG. 6 depicts a conceptual view for explaining the software arrangement of the PD printer apparatus and digital camera which support NCDP according to the embodiment.

FIG. 6 depicts a view showing an example of the NCDP arrangement.

In FIG. 6, reference numeral 600 denotes a USB interface; numeral 601 denotes a Bluetooth interface; numeral 602 denotes an application layer which is assembled in constructing an NCDP system; and numeral 603 denotes a layer which is used to execute existing protocols and interfaces and contains PTP (Picture Transfer Protocol), SCSI and Bluetooth BIPs (Basic Image Profiles), a USB interface, and the like. NCDP according to the embodiment assumes that an architecture such as a protocol layer is adopted and NCDP is supported as an application on the architecture. In this case, the PD printer apparatus 1000 and digital camera 3012 are respectively defined as a USB host and USB slave. The PD printer apparatus 1000 and digital camera 3012 have the same NCDP arrangement, as shown in FIG. 6.

FIG. 7 depicts a chart for explaining the flow of NCDP communication procedures between the PD printer apparatus 1000 and the digital camera (DSC) 3012 according to the embodiment.

If it is detected that the PD printer apparatus 1000 and DSC 3012 have been connected by the cable 5000, as shown in FIG. 5, these devices can communicate with each other. Applications installed in these devices are executed to start shift to NCDP procedure 701. Reference numeral 702 denotes an NCDP initial state in which whether these devices can execute NCDP is decided. If so, the flow shifts to NCDP procedure 701. If the DSC 3012 does not support NCDP, no NCDP communication control is executed. If the DSC 3012 designates image data transfer/printing by "basic procedures" after shift to NCDP, as represented by 703, the flow shifts to a simple print mode in which an image file is transferred from the DSC 3012 to the PD printer apparatus 1000 and printed. If the DSC 3012 designates image data transfer/printing by "recommended procedures", as represented by 704, various negotiations are done between the DSC 3012 and the PD printer apparatus 1000 to decide print conditions. Thereafter, the flow shifts to a more advanced print mode in which an image file is transferred from the DSC 3012 to the PD printer apparatus 1000 and printed. If the DSC 3012 designates "extended procedures", as represented by 705, a mode in which printing is done with an advanced layout function such as DPOF, XHTML-print, or SVG, and vender-unique specifications of each vendor is set. Note that detailed specifications by the "extended procedures" are defined by extended specifications unique to each DSC vendor, and will not be particularly explained. Image printing processes by the "basic procedures" and "recommended procedures" will be described with reference to FIGS. 9 to 11.

FIG. 8 depicts a table for explaining commands which are defined to perform NCDP printing according to the embodiment.

In FIG. 8, a "corresponding mode" corresponds to the above-described "basic procedures", "recommended procedures", and "extended procedures" which are designated from the DSC 3012. The "recommended procedures" can use all commands. The "basic procedures", which correspond to the simple print mode, can use only shift to NCDP, end of NCDP, shift commands to the modes of the "basic procedures", "recommended procedures", and "extended procedures", acquisition of image data from the camera 3012, and a print instruction from the camera 3012. In FIG. 8, the "extended procedures" can use only shift to NCDP, end of NCDP, and shift commands to the modes of the "basic procedures", "recommended procedures", and "extended procedures". As described above, the "extended procedures" can employ other commands in accordance with the specifications of each vendor.

For example, it is also possible that the "extended procedures" use a Capability command, similar to the "recommended procedures", and the Capability contents contain vendor-unique parameter types and parameter values which are inherent in the "extended procedures".

Image printing processes by the "basic procedures" and "recommended procedures" will be explained.

Figure 9:
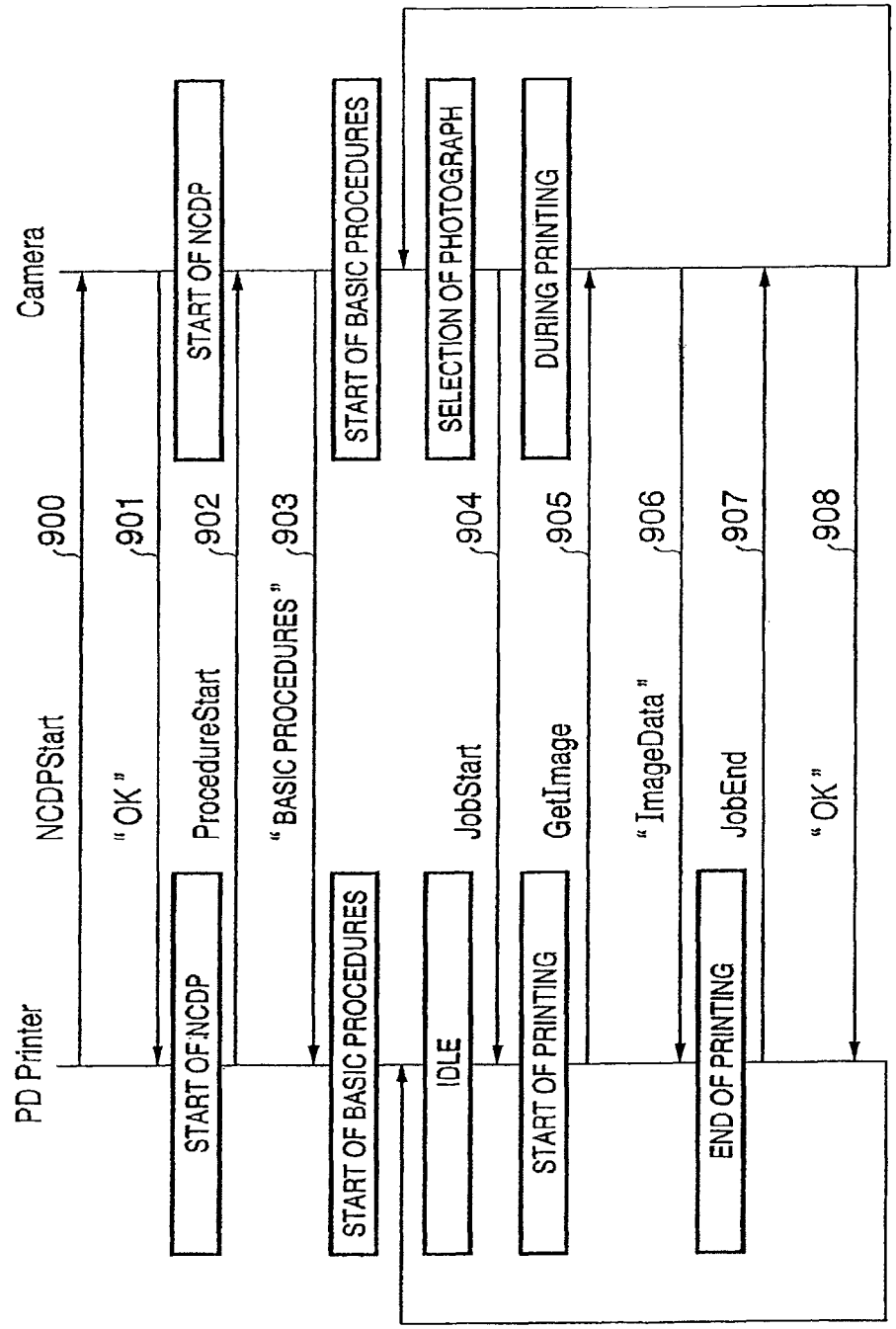
FIG. 9 depicts a chart for explaining print procedures by "basic procedures" in NCDP according to the embodiment.

FIG. 9 depicts a chart for explaining NCDP communication procedures in image printing by the "basic procedures". The "basic procedures" correspond to the simple print mode in which only one image file not including print condition information is transferred in every a print instruction from the DSC 3012 to the PD printer apparatus 1000 and printed.

Accordingly, the PD printer 1000 decides a print condition of color correction and data conversion and the like. Corresponding image formats are an RGB image of VGA size (640×480 pixels) and a JPEG image of VGA size (640×480 pixels). The image file size is about 1 Mbyte or less. The DSC 3012 transmits an image file by an image format supported by the PD printer apparatus 1000. In this case, no error handling is executed.

In 900, the PD printer apparatus 1000 transmits to the DSC 3012 a command (NCDPStart) which designates shift to NCDP. If the DSC 3012 supports NCDP, it sends back "OK" (901). An example using PTP will be described in detail later with reference to FIG. 14, as an example of performing NCDP confirmation procedures.

After the PD printer apparatus 1000 and DSC 3012 confirm that they both support NCDP, the PD printer apparatus 1000 transmits to the DSC 3012 an instruction (ProcedureStart) for shifting to the NCDP mode (902). If the DSC 3012 sends in 903 the "basic procedures" which correspond to the simple print mode, the print mode shifts to a mode by the "basic procedures". In this case, if an image to be printed is selected and printing is designated by operation to the DSC 3012, the DSC 3012 sends to the PD printer apparatus 1000 a command (JobStart) which designates the start of printing (904). In response to this, the PD printer apparatus 1000 shifts to the simple print mode, transmits a command (GetImage) to the DSC 3012, and requests a JPEG image (905). The DSC 3012 transmits a JPEG image (ImageData) to the PD printer apparatus 1000 (906), and print processing in the PD printer apparatus 1000 starts. After printing of the designated image ends, the PD printer apparatus 1000 transmits to the DSC 3012 a command (JobEnd) representing the end of the print job (907). If the DSC 3012 sends back an acknowledgement (OK) in response to this command (908), print processing by the "basic procedures" ends. The "basic procedures" is decided on the assumption of simply exchanging information for designating an image to be printed, so when a print operation has been decided in the "basic procedures", the print operation is immediately started without exchanging Capability as described later. However, whether to perform processing by the "basic procedures" may be decided by the capabilities of both the DSC and PD printer apparatus.

In this embodiment, the DSC acquires which of the "basic procedures", "recommended procedures", and "extended procedures" are supported by the printer. However, the present invention is not limited to this method, and the DSC may select proper procedures on the basis of printer information such as the printer name or vendor name. For example, the DSC holds "a list of printer names which support the recommended procedures". The DSC selects the recommended procedures if the name of a connected printer is found in the list, and the basic procedures if the name is not found.

FIG. 25 shows an example in which a printer vendor name and printer model name are described in a script sent from the printer to the DSC in a ProcedureStart command. FIG. 26 shows an example in which a DSC vendor name and DSC model name are described in a script subsequently sent from the DSC to the printer.

In the embodiment, the JobStart command in the "basic procedures" designates only the image to be printed. An image format and file size are explained to be determined in advance. This means a print operation is able to be performed without exchanging Capability. However, even if Capability is not exchanged, a print condition of an image format and print size and the like can be designated. The DSC may designate, in the JobStart command, items which are recognized by the printer and DSC to be "always supported by the printer" or "appropriately processed by the printer in accordance with its capability", similar to the image format. For this, upon exchanging information of devices and only when it is determined that both are predetermined devices, a print condition can be designated by a print job (script) without Capability. However, in order to simplify the setting operation, the "basic procedures" is important for providing an operation procedure for a beginner.

FIG. 27 shows an example in which no Capability setting is contained in a script sent from the DSC to the printer in the JobStart command in the "basic procedures". FIG. 28 shows an example in which items "always supported by the printer" or "appropriately processed by the printer in accordance with its own capability" that are recognized in advance between the printer and the DSC are set in a script sent from the DSC to the printer in the JobStart command in the "basic procedures".

FIG. 10 depicts a chart for explaining NCDP communication procedures in image printing by the "recommended procedures". The same reference numerals as in FIG. 9 denote the same procedures in FIG. 10, and a description thereof will be omitted. The "recommended procedures" can set a "more advanced print mode" which assumes negotiations between the PD printer apparatus 1000 and the DSC 3012. Printing of a plurality of photographs can be realized by one print instruction. Further, the DSC 3012 sends information of print condition by a script format (text) to the PD printer apparatus 1000, and the PD printer apparatus 1000 can print an image based on the print condition including color setting and layout and the like. Also, error handling can be executed.

In FIG. 10, after the PD printer apparatus 1000 and DSC 3012 confirm that they both support NCDP, similar to FIG. 9, the DSC 3012 designates the "recommended procedures" (910). Procedures by the "recommended procedures" are executed. As represented by 911, the PD printer apparatus 1000 notifies the DSC 3012 of, as Capability information, all the functions of the PD printer apparatus 1000 and functions including paper setting. The Capability information is transmitted in a script format (text) to the DSC 3012.

FIG. 12 shows an example of the Capability information.

As shown in FIG. 12, the Capability information contains the type and size of printable paper, the print quality, the image data format, the presence/absence of date printing, the presence/absence of file name printing, the layout, the presence/absence of image correction, and as an option the presence/absence of functions corresponding to the specifications of each camera vendor.

The script notation of Capability information facilitates porting to the architecture of another communication protocol, and standardization of exchange of function information. The script notation may comply with XML.

The user of the DSC 3012 which has received the Capability information determines which of the functions of the PD printer apparatus 1000 is used to perform printing. The user selects an image to be printed, and selects and decides the print conditions of the image from the functions of the PD printer apparatus 1000. After the image to be printed, the print conditions, and the like are decided and the start of printing is designated, a print instruction (JobStart) is sent to the PD printer apparatus 1000. The PD printer apparatus 1000 issues a command (GetImagexn) which requests image data (912). In response to this, the DSC 3012 transmits corresponding image data (ImageData) in an image format (Tiff, JPEG, RGB, or the like) receivable by the PD printer apparatus 1000 (913). A plurality of image data can be transmitted for printing of one image. This is because, when, for example, 2×2 layout printing is designated, image data of four images must be transmitted for one paper sheet. After printing of the designated image ends, the PD printer apparatus 1000 transmits to the DSC 3012 a command (JobEnd) representing the end of the print job (907). If the DSC 3012 sends back an acknowledgement (OK) in response to this command (908), processing shifts to image selection/print processing by the "recommended procedures".

In the embodiment, the printer 1000 issues a Capability information to the DSC 3012 without any request from the DSC 3012. The present invention is not limited to this method, and it is also possible that the DSC requests Capability of the printer and the printer notifies the DSC of Capability in response to the request. With respect the above described point of view:

ProcedureStart command representing "shift to the recommended procedures" is received, Capability is sent, so that "ProcedureStart command" has the same meaning as "Capability request"

Capability information is sent as a response to "ProcedureStart command" as Capability request.

FIG. 11 depicts a chart for explaining communication procedures when an error occurs in the PD printer apparatus 1000 in NCDP communication procedures in image printing by the "recommended procedures". The same reference numerals as in FIG. 10 denote the same procedures, and a description thereof will be omitted.

In this example, a paper feed error occurs in the PD printer apparatus 1000 during print processing by the "recommended procedures". In 914, the PD printer apparatus 1000 transmits to the DSC 3012 status information (Status) representing the paper feed error. The DSC 3012 transmits to the PD printer apparatus 1000 a command representing whether to continue (JobContinue) or abort (JobAbort) print processing on the basis of the decision by the user of the DSC 3012. If "abort" is designated, the PD printer apparatus 1000 aborts print processing, transmits a print job end notification (JobEnd), and ends printing. If "continue" is designated, the PD printer apparatus 1000 waits for recovery of the paper feed error, and then continues print processing.

The above-described processing procedures will be explained with reference to the flow chart of FIG. 13.

Figure 13:
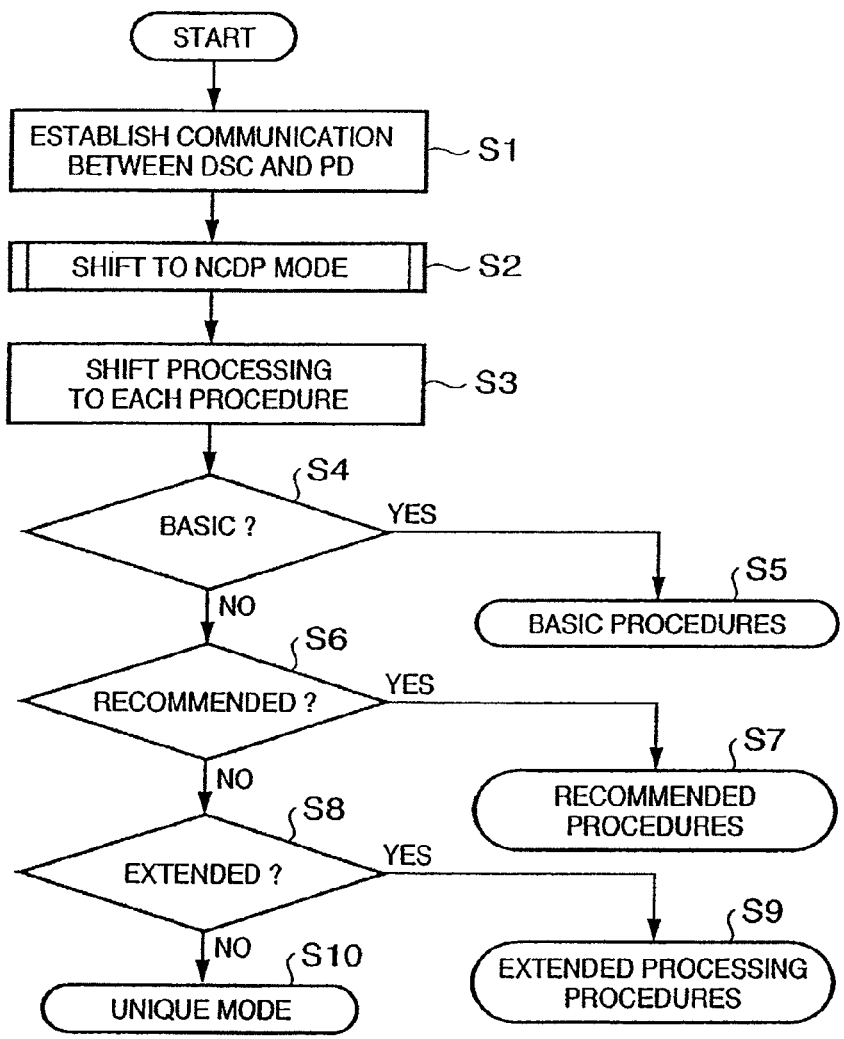
FIG. 13 is a flow chart for explaining the outline of NCDP communication procedures according to the embodiment.

FIG. 13 is a flow chart for explaining the processing procedures shown in FIG. 7.

In step S1, communication is established between the digital camera (DSC) 3012 and the PD printer apparatus 1000 (700). In step S2, whether these devices support NCDP is determined, and if YES, the processing shift to NCDP. The flow advances to step S3 to receive a procedure instruction from the DSC 3012, and the processing shifts to the designated procedure. If the "basic procedures" are designated, the flow advances from step S4 to step S5 to execute print processing by the "basic procedures". If the "recommended procedures" are designated, the flow advances from step S6 to step S7 to execute print processing by the "recommended procedures". If the "extended procedures" are designated, the flow advances from step S8 to step S9 to execute print processing by "extended procedures" corresponding to each vendor. Otherwise, the flow advances to step S10 to execute printing in a mode unique to the PD printer apparatus 1000 and DSC 3012.

In FIG. 13 according to the embodiment, the processing shifts from the NCDP mode to the "basic procedures", "recommended procedures", "extended procedures", or "unique mode". It is also possible that, immediately when the "basic procedures" are selected at the same time as shift to the NCDP mode, JobStart can be received, and then the processing shifts to another procedure or mode in accordance with a request from the DSC or printer.

According to the embodiment, a shift to a condition being able to print has a priority. For a unskilled person who is a poor at complicated setting, it becomes easier to print without setting complicated settings. On the other hand, for a good skilled person, a print image can be obtained under a higher print condition. In this way, a print system can be configured based on the level of user's skill.

An example (PTP wrapper) of realizing various NCDP commands (FIG. 8) described above by using general-purpose PTP will be explained. The embodiment will describe NCDP using PTP, but the present invention is not limited to this. For example, a direct print service API may be supported by another interface and another class.

[NCDPStart]

Figure 14:
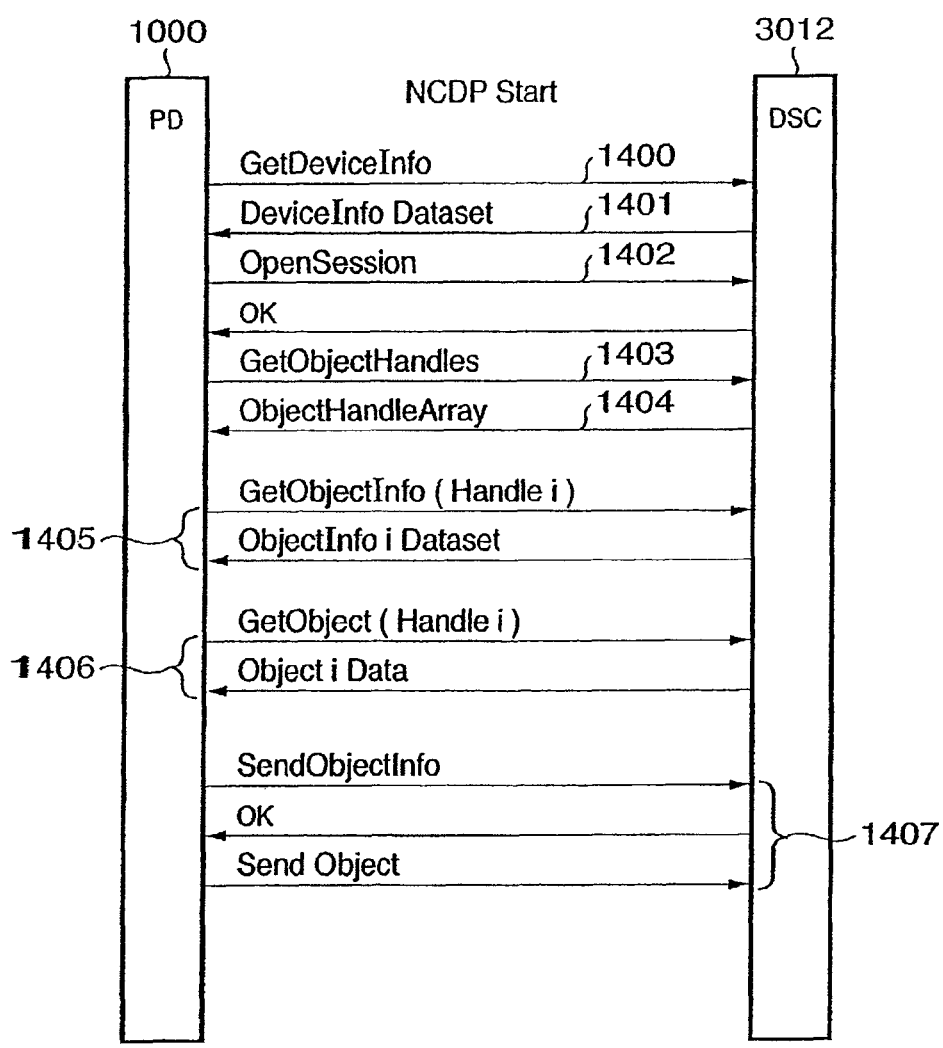
FIG. 14 depicts a chart for explaining an example of realizing by using a PTP architecture an instruction (NCDPStart) which designates the start of NCDP procedures.

FIG. 14 depicts a chart for explaining an example of realizing by using a PTP architecture an instruction (NCDPStart) which designates the start of NCDP procedures.

After the PD printer apparatus 1000 and DSC 3012 are physically connected, the PD printer apparatus 1000 transmits GetDeviceInfo to the DSC 3012 in 1400, and requests, of the DSC 3012, information on an object held by the DSC 3012. In response to this, the DSC 3012 transmits, to the PD printer apparatus 1000 by DeviceInfoDataset, information on the object held by the DSC 3012. By OpenSession in 1402, the PD printer apparatus 1000 assigns the DSC 3012 as a resource, if necessary assigns a handle to a data object, and issues a start request for procedures of performing special initialization. If the DSC 3012 sends back an acknowledge (OK), PTP communication starts. In 1403, the PD printer apparatus 1000 transmits GetObjectHandles to the DSC 3012, and requests all script handles (Storage ID: FFFFFF, Object Type: Script). In 1404, the DSC 3012 sends back a list of all handles (ObjectHandleArray) held by the DSC 3012. In 1405 and 1406, the ith object handle information is acquired from the PD printer apparatus 1000. If this object contains a keyword (e.g., password "Marco") representing the identification of the DSC 3012, the PD printer apparatus 1000 instructs in 1407 the DSC 3012 to transmit object information (SendObjectInfo). If the PD printer apparatus 1000 receives an acknowledge (OK), it transmits the object information to the DSC 3012 by SendObject. The object contains, e.g., "Polo" as a response keyword to the first keyword.

In this manner, the PD printer apparatus 1000 and DSC 3012 can recognize each other as connected partners. After that, the processing can shift to NCDP procedures (701 in FIG. 7). Transport layers capable of exchanging files can reliably exchange keywords. That is, keywords can be exchanged using the PTP architecture without adding an NCDP-unique command and the like in the embodiment. The keyword is not limited to the above example, and the DSC 3012 and PD printer apparatus 1000 may use the same keyword. To shorten the time taken for negotiations by the keyword, the keyword may be set at the start of a script handle. This can shorten the time taken to confirm partner devices.

[ProcedureStart]

Figure 15:
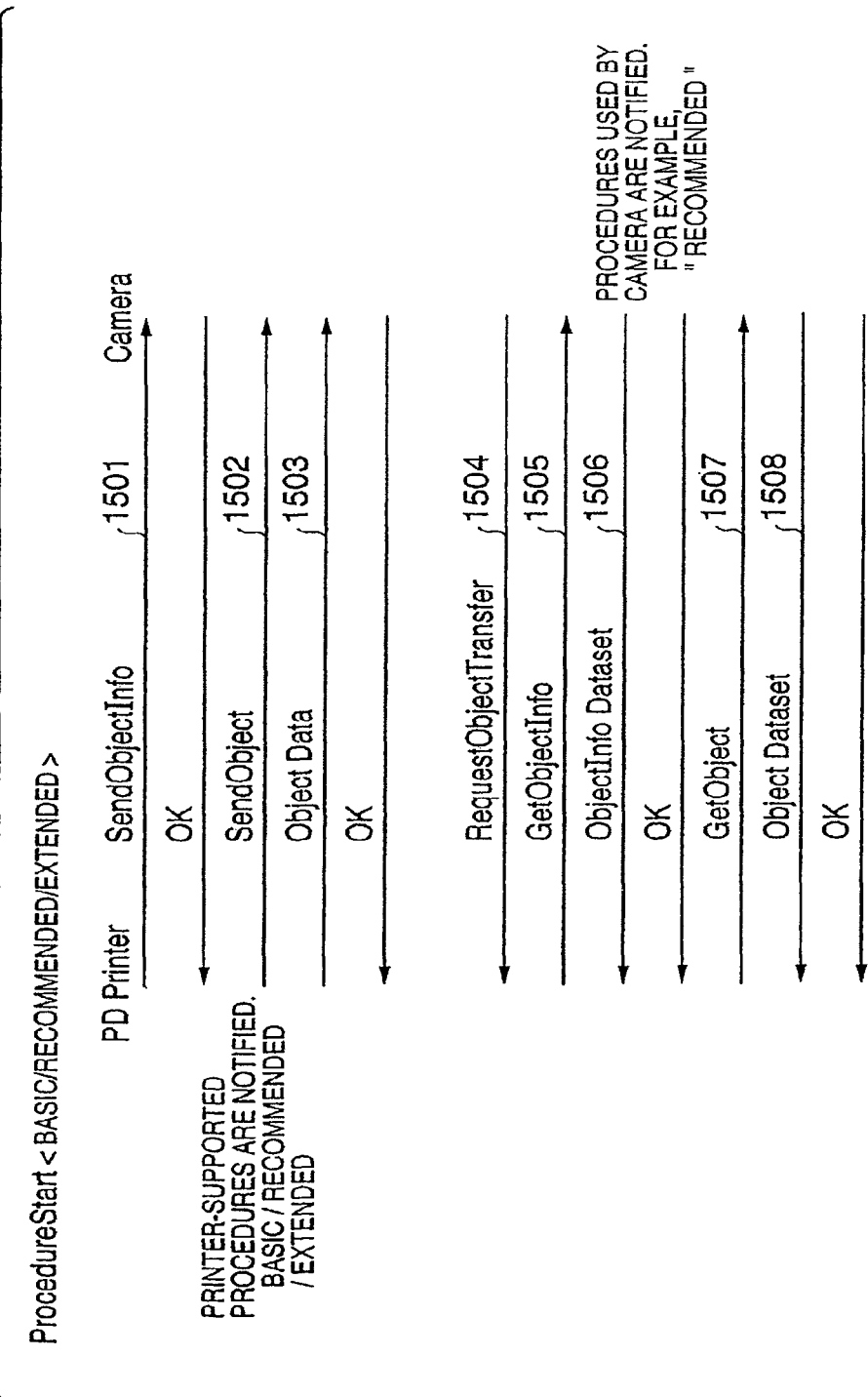
FIG. 15 depicts a chart for explaining an example of realizing, by using the PTP architecture, procedures (ProcedureStart) in which a shift instruction to each procedure is received from a camera in NCDP procedures.

FIG. 15 depicts a chart for explaining an example in which an instruction which designates shift procedures to the NCDP print mode is received from the DSC 3012, and an instruction (ProcedureStart) (902) from the PD printer apparatus 1000 to the DSC 3012 for shifting to the mode is realized by using the PTP architecture.

In 1501, the PD printer apparatus 1000 notifies the DSC 3012 by SendObjectInfo of object information to be transmitted, in order to notify the DSC 3012 of the procedures: "basic procedures", "recommended procedures", and "extended procedures" which are supported by the PD printer apparatus 1000. If the DSC 3012 sends an acknowledge (OK), the PD printer apparatus 1000 notifies the DSC 3012 by SendObject in 1502 of transmission of an object. In 1503, the PD printer apparatus 1000 transmits, by ObjectData, information on the procedures supported by the PD printer apparatus 1000. In 1504, the DSC 3012 notifies the PD printer apparatus 1000 that GetObject operation is to be activated (shift to a push mode) (RequestObjectTransfer). If the PD printer apparatus 1000 notifies the DSC 3012 in 1505 that the PD printer apparatus 1000 is to receive information on object information (GetObjectInfo), the DSC 3012 sends back the information to the PD printer apparatus 1000 by ObjectInfoDataset in 1506. If the PD printer apparatus 1000 designates and requests the object information in 1507, the DSC 3012 notifies the PD printer apparatus 1000 by ObjectDataset of procedures ("basic", "recommended", "extended", or the like) used by the DSC 3012 (1508).

In this fashion, the DSC 3012 can instruct the PD printer apparatus 1000 of the print mode of an image.

[NCDPEnd]

Figure 16:
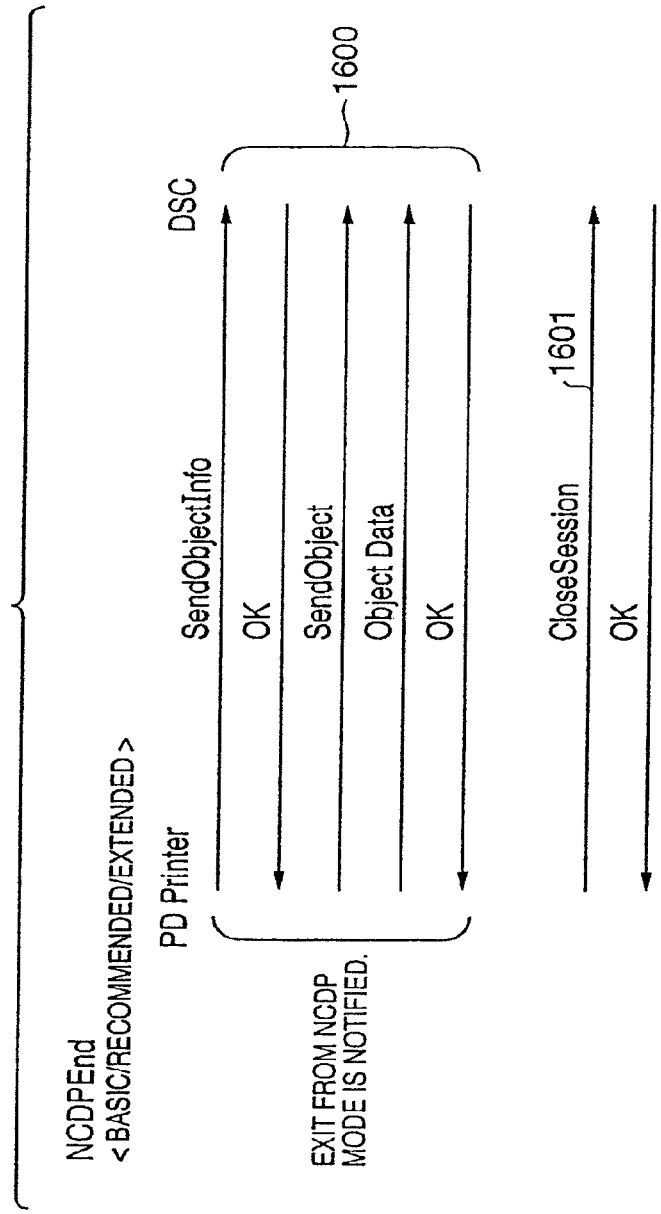
FIG. 16 depicts a chart for explaining an example of realizing by using the PTP architecture an instruction (NCDPEnd) which designates the end of NCDP procedures.

FIG. 16 depicts a chart for explaining an example of realizing by using the PTP architecture an instruction (NCDPEnd) for ending communication control procedures in NCDP according to the embodiment.

In these procedures, the PD printer apparatus 1000 notifies the DSC 3012 in 1600 of object information to be transmitted (SendObjectInfo). The PD printer apparatus 1000 notifies the DSC 3012 by SendObject of transmission of the object information, and notifies the DSC 3012 by ObjectData of exit from the NCDP mode. If the PD printer apparatus 1000 receives an acknowledge (OK), it transmits CloseSession in 1601, and ends communication. As a result, the NCDP communication procedures end.

[Capability]

Figure 17:
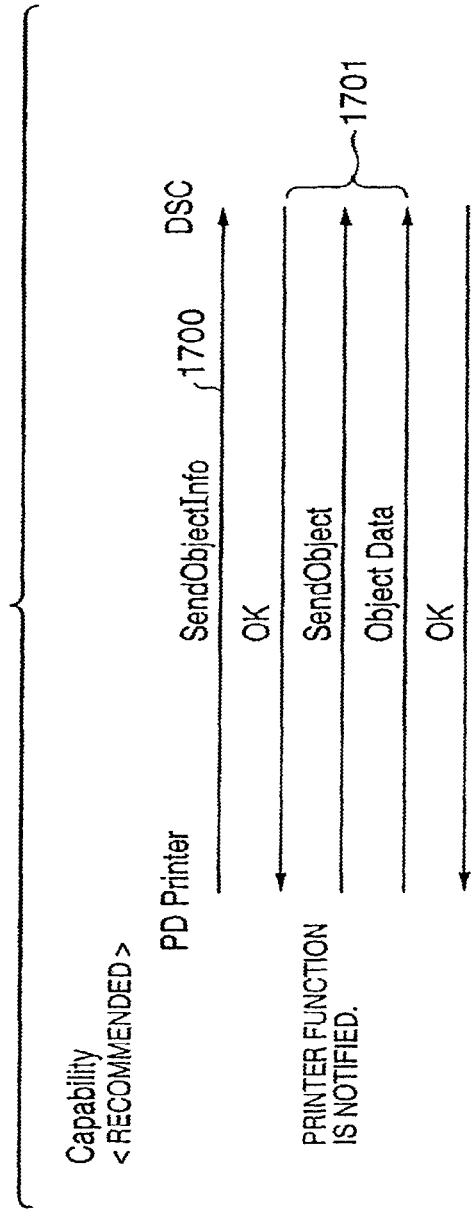
FIG. 17 depicts a chart for explaining an example of realizing by using the PTP architecture an instruction (Capability) for transmitting Capability from the PD printer apparatus to the camera in NCDP procedures.

FIG. 17 depicts a chart for explaining an example of realizing, by using the PTP architecture, communication procedures by a Capability instruction which notifies the DSC 3012 of the function of the PD printer apparatus 1000 in NCDP according to the embodiment.

In these procedures, the PD printer apparatus 1000 notifies the DSC 3012 in 1700 by SendObjectInfo of object information to be transmitted. In 1701, the PD printer apparatus 1000 notifies the DSC 3012 by SendObject of transmission of the object information, and notifies the DSC 3012 by ObjectData of the functions of the PD printer apparatus 1000 in the script format (FIG. 12).

[GetImage]

Figure 18:
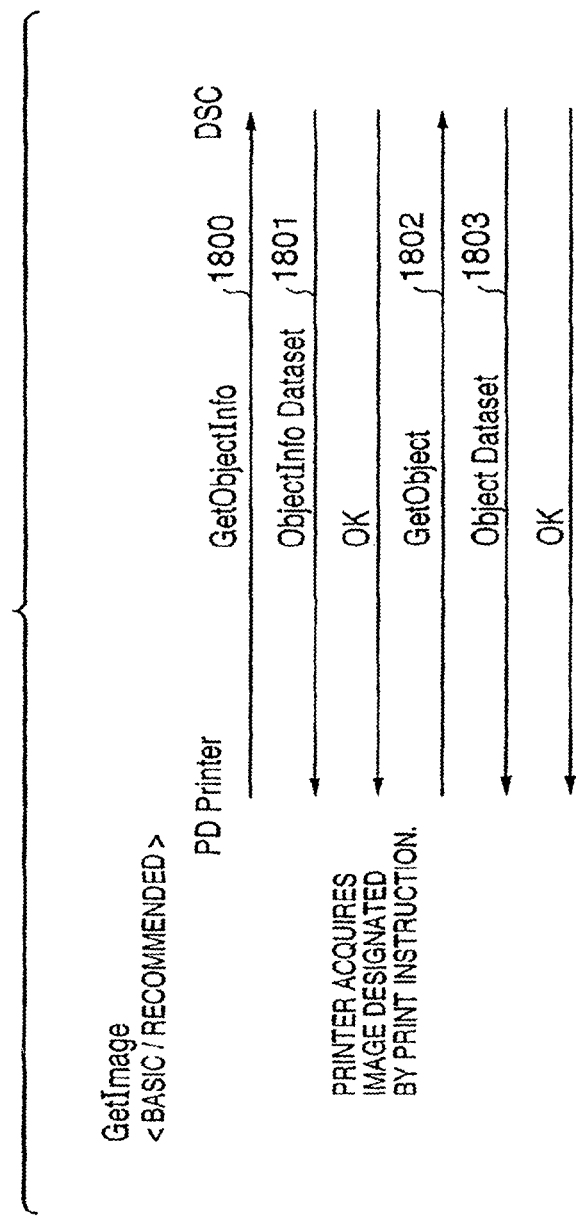
FIG. 18 depicts a chart for explaining an example of realizing by using the PTP architecture the procedures of an instruction (GetImage) in which the PD printer apparatus acquires an image file held by the camera in NCDP procedures.

FIG. 18 depicts a chart for explaining an example of realizing, by using the PTP architecture, communication procedures (GetImage) in which the PD printer apparatus 1000 acquires image data (JPEG image) held by the DSC 3012 in NCDP according to the embodiment.

In 1800, the PD printer apparatus 1000 requests information on an object held by the DSC 3012. In 1801, the DSC 3012 sends information (ObjectInfoDataset) on the object to the PD printer apparatus 1000. In 1802, the PD printer apparatus 1000 designates the object, and issues an acquisition request (GetObject). In 1803, the DSC 3012 transmits the requested image file (ObjectDataset) to the PD printer apparatus 1000. As a result, the PD printer apparatus 1000 can acquire a desired image file from the DSC 3012.

[StatusSend]

Figure 19:
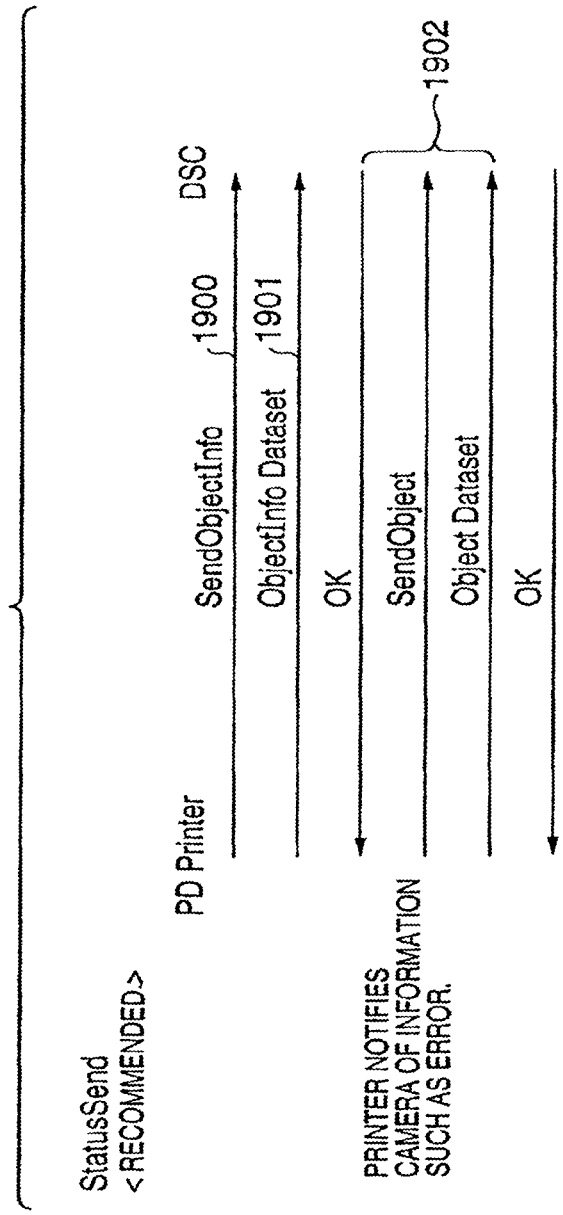
FIG. 19 depicts a chart for explaining an example of realizing, by using the PTP architecture, the procedures of an instruction (StatusSend) for transmitting an error status from the PD printer apparatus to the camera in NCDP procedures.

FIG. 19 depicts a chart for explaining an example of realizing, by using the PTP architecture, communication procedures (StatusSend) in which the PD printer apparatus 1000 notifies the DSC 3012 of an error status in NCDP according to the embodiment.

In 1900, the PD printer apparatus 1000 notifies the DSC 3012 by SendObjectInfo of object information to be transmitted. In 1901, the PD printer apparatus 1000 transmits an information set (ObjectInfoDataset) on the object information to the DSC 3012. In response to an acknowledge (OK) from the DSC 3012, the PD printer apparatus 1000 transmits status information such as an error in the PD printer apparatus 1000 by SendObject and ObjectDataset. Data which is transmitted from the PD printer apparatus 1000 to the DSC 3012 is text data (script).

[PageEnd]

Figure 20:
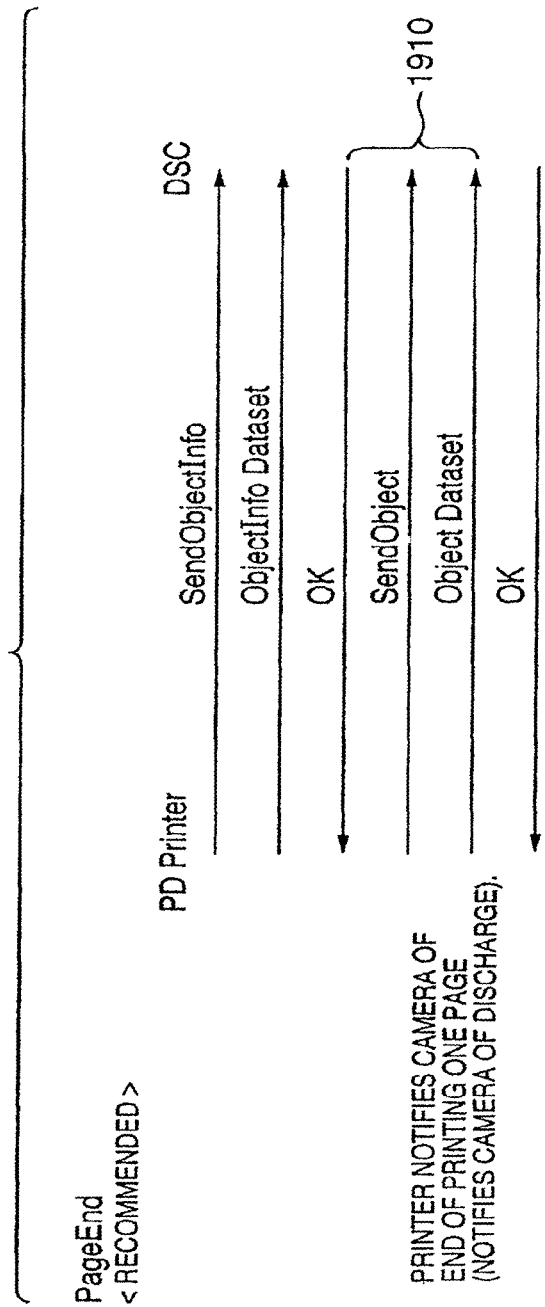
FIG. 20 depicts a chart for explaining an example of realizing, by using the PTP architecture, the procedures of an instruction (PageEnd) for transmitting the end of printing one page from the PD printer apparatus to the camera in NCDP procedures.

FIG. 20 depicts a chart for explaining an example of realizing, by using the PTP architecture, communication procedures (PageEnd) in which the PD printer apparatus 1000 notifies the DSC 3012 of the end of print processing of one page in NCDP according to the embodiment.

[JobEnd]

Figure 21:
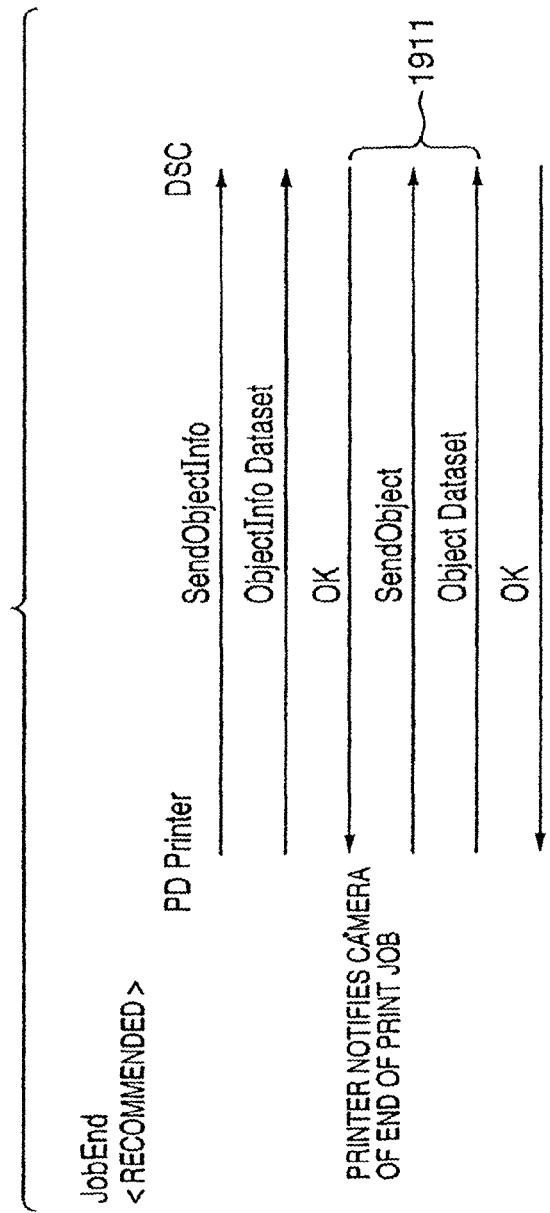
FIG. 21 depicts a chart for explaining an example of realizing, by using the PTP architecture, procedures of issuing a print job end instruction (JobEnd) from the PD printer apparatus to the camera in NCDP procedures.

FIG. 21 depicts a chart for explaining an example of realizing, by using the PTP architecture, communication procedures (JobEnd) in which the PD printer apparatus 1000 notifies the DSC 3012 of the end of a print job in NCDP according to the embodiment.

In FIGS. 20 and 21, after procedures 1900 and 1901 in FIG. 19 are executed, the PD printer apparatus 1000 notifies the DSC 3012 in 1910 of FIG. 20 of the end of print processing of one page. In 1911 of FIG. 21, the PD printer apparatus 1000 notifies the DSC 3012 of the end of the print job. Data (page end and job end) which are transmitted from the PD printer apparatus 1000 to the DSC 3012 are text data (script).

[JobStart]

Figure 22:
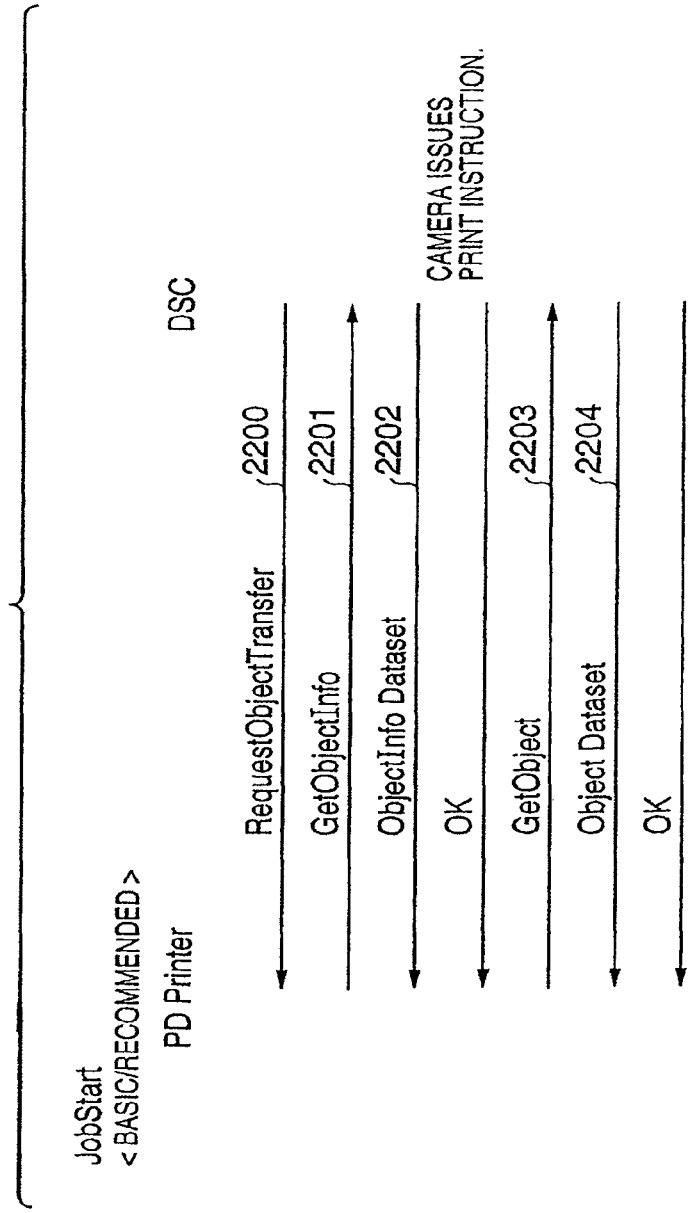
FIG. 22 depicts a chart for explaining an example of realizing, by using the PTP architecture, procedures of issuing a print instruction (JobStart) from the camera to the PD printer apparatus in NCDP procedures.

FIG. 22 depicts a chart for explaining an example of realizing, by using the PTP architecture, communication procedures (JobStart) in which the PD printer apparatus 1000 notifies the DSC 3012 of the start of a print job in NCDP according to the embodiment.

In 2200, the DSC 3012 sends RequestObjectTransfer to the PD printer apparatus 1000, and prompts the PD printer apparatus 1000 to issue a GetObject command. If the PD printer apparatus 1000 issues GetObjectInfo in 2201, the DSC 3012 transmits information on object information to be transmitted. If the PD printer apparatus 1000 requests the object information (GetObject: 2203), the DSC 3012 transmits ObjectDataset in 2204, and issues a print instruction to the PD printer apparatus 1000. Data (print start instruction) which is transmitted from the DSC 3012 to the PD printer apparatus 1000 is text data (script).

[JobAbort]

Figure 23:
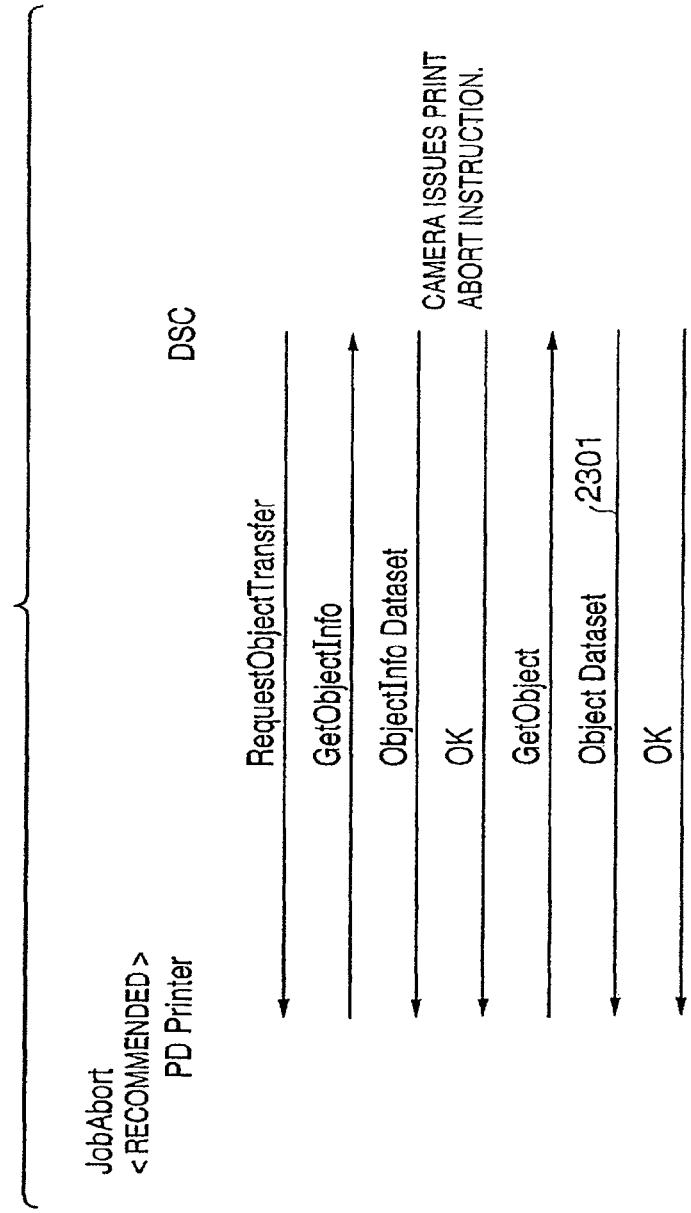
FIG. 23 depicts a chart for explaining an example of realizing, by using the PTP architecture, procedures of issuing a print abort instruction (JobAbort) from the camera to the PD printer apparatus in NCDP procedures.

FIG. 23 depicts a chart for explaining an example of realizing, by using the PTP architecture, communication procedures (JobAbort) in which the DSC 3012 issues a print abort instruction to the PD printer apparatus 1000 in NCDP according to the embodiment.

[JobContinue]

Figure 24:
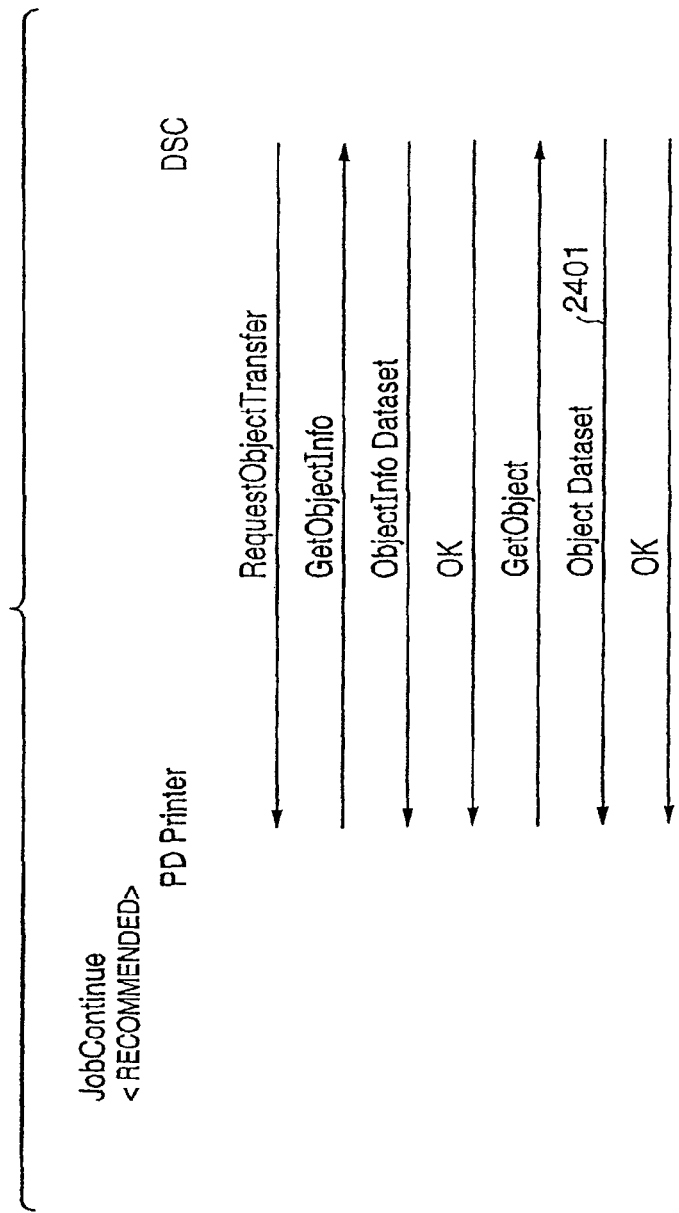
FIG. 24 depicts a chart for explaining an example of realizing, by using the PTP architecture, procedures of issuing a print restart instruction (JobContinue) from the camera to the PD printer apparatus in NCDP procedures.

FIG. 24 depicts a chart for explaining an example of realizing, by using the PTP architecture, communication procedures (JobContinue) in which the DSC 3012 issues a print restart instruction to the PD printer apparatus 1000 in NCDP according to the embodiment.

In FIGS. 23 and 24, after procedures 2200 to 2203 in FIG. 22 are executed, the DSC 3012 issues a print abort instruction to the PD printer apparatus 1000 in 2301 of FIG. 23. In 2401 of FIG. 24, the DSC 3012 notifies the PD printer apparatus 1000 of a print restart instruction. Data (print abort instruction and print restart instruction) which are transmitted from the DSC 3012 to the PD printer apparatus 1000 are text data (script).

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiment (processes executed on the camera side and various print processes executed on the printer side) is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As has been described above, according to the above-described embodiment, a PD printer apparatus and DSC are respectively set as a host and slave. Before print operation, Capability information of the PD printer apparatus is transmitted to the DSC. The DSC decides an optimal print mode on the basis of the Capability information.

The Capability information is transmitted as a script. This facilitates porting to another communication protocol and standardization.

Communication procedures between devices use a general-purpose file and general-purpose format. An upper layer defines the communication procedure layer of an application according to the embodiment. Communication procedures independent of various interface specifications can be defined.

In the print system of the embodiment, many unspecified devices are connected via various interfaces. Information must be exchanged by standard specifications supported by various interfaces. Function information which is necessary for transmission/reception between devices is realized by "file transfer" or "object transfer", easily complying with various interface specifications.

The image supply device includes a PDA, cell phone, television, video device, and image storage device, in addition to a digital camera.

The general-purpose interface includes connection to a network such as the Internet, in addition to the above-mentioned USB and IEEE 1394.

The present invention is not limited to the above embodiments and various changes and modifications can be made within the spirit and scope of the present invention. Therefore, to apprise the public of the scope of the present invention, the following claims are made.

What is claimed is:

1. An image supply device having a display unit and for communicating with a printing apparatus, the image supply device implementing the following processes of:
    setting an image to be displayed on the display unit;
    designating the image set by the setting process as a print target image;
    selecting a first job issuing procedure or a second job issuing procedure in accordance with a type of the printing apparatus;
    obtaining capability information that is used for setting a print condition by communicating with the printing apparatus in a case that selecting process selects the second job issuing procedure; and
    transmitting a job for printing the image set by the setting process and designated as the print target image by the designating process to the printing apparatus,
    wherein (i) in a case that the selecting process selects the first job issuing procedure, the transmitting process transmits the job without user operation for setting a print condition of the print target image after a designation by the designating process, and (ii) in a case that the selecting process selects the second job issuing procedure, the transmitting process transmits the job that includes a print condition that has been set by a user based on the capability information obtained by the obtaining process.

2. The image supply device according to claim 1, wherein in the first job issuing procedure, the job includes information for specifying the image and does not include the print condition.

3. The image supply device according to claim 1, wherein the selecting process selects the first job issuing procedure by default.

4. The image supply device according to claim 1, wherein the selecting process is operable to select the second job issuing procedure after the job has been generated in the first job issuing procedure.

5. The image supply device according to claim 1, wherein the selecting process further selects either the first job issuing procedure or the second job issuing procedure in accordance with a vendor name of the printing apparatus.

6. The image supply device according to claim 1, wherein in the first job issuing procedure, the job includes information for specifying the image and includes the print condition that the printing apparatus always supports.

7. A method of controlling an image supply device having a display unit, for communicating with a printing apparatus, the method comprising:
    a selection step of selecting an image to be displayed on the display unit;
    a print designation step of designating the image selected in the selection step as a print target image;
    a procedure selection step of selecting a first job issuing procedure or a second job issuing procedure in accordance with a type of the printing apparatus;
    an obtaining step of obtaining capability information that is used for setting a print condition by communicating with the printing apparatus in a case that the procedure selection step selects the second job issuing procedure; and
    a transmission step of transmitting a job for printing the image selected in the selection step and designated as the print target image in the print designation step to the printing apparatus, wherein (i) in a case that the procedure selection step selects the first job issuing procedure, the transmission step transmits the job without user operation for setting a print condition of the print target image after a designation in the print designation step, and (ii) in a case that the procedure selection step selects the second job issuing procedure, the transmission step transmits the job that includes a print condition that has been set by a user based on the capability information obtained in the obtaining step.

8. The method according to claim 7, wherein in the first job issuing procedure, the job includes information for specifying the image and does not include the print condition.

9. The method according to claim 7, wherein the procedure selection step selects the first job issuing procedure by default.

10. The method according to claim 7, wherein the procedure selection step is operable to select the second job issuing procedure after the job has been generated in the first job issuing procedure.

11. The method according to claim 7, wherein the procedure selection step further selects either the first job issuing procedure or the second job issuing procedure in accordance with a vendor name of the printing apparatus.

12. The method according to claim 7, wherein in the first job issuing procedure, the job includes information for specifying the image and includes the print condition that the printing apparatus always supports.

13. An image supply device having a display unit, for communicating with a printing apparatus, the image supply device implementing the following processes of:
    setting an image to be displayed on the display unit;
    designating the image set by the setting process as a print target image;
    selecting a first job issuing procedure or a second job issuing procedure;
    obtaining capability information that is used for setting a print condition by communicating with the printing apparatus in a case that the selecting process selects the second job issuing procedure; and
    transmitting a job for printing the image set by the setting process and designated as the print target image by the designating process to the printing apparatus, wherein (i) in a case that the selecting process selects the first job issuing procedure, the transmitting process transmits the job which includes a predetermined print condition that has been set in advance before the designation by the designating process, and (ii) in a case that the selecting process selects the second job issuing procedure, the transmitting process transmits the job that includes the print condition that has been set by a user based on the capability information obtained by the obtaining process.

14. The image supply device according to claim 13, wherein in the first job issuing procedure, the job includes information for specifying the image and does not include the print condition.

15. The image supply device according to claim 13, wherein the selecting process selects the first job issuing procedure by default.

16. The image supply device according to claim 13, wherein the selecting process is operable to select the second job issuing procedure after the job has been generated in the first job issuing procedure.

17. The image supply device according to claim 13, wherein the selecting process further selects either the first job issuing procedure or the second job issuing procedure in accordance with a vender name of the printing apparatus.

18. The image supply device according to claim 13, wherein in the first job issuing procedure, the job includes information for specifying the image and includes the print condition that the printing apparatus always supports.

19. A method of controlling an image supply device having a display unit, for communicating with a printing apparatus, the method comprising:
- a selection step of selecting an image to be displayed on the display unit;
- a print designation step of designating the image selected in the selection step as a print target image;
- a procedure selection step of selecting a first job issuing procedure or a second job issuing procedure;
- an obtaining step of obtaining capability information that is used for setting a print condition by communicating with the printing apparatus in a case that the procedure selection step selects the second job issuing procedure; and
- a transmission step of transmitting a job for printing the image selected in the selection step and designated as the print target image in the print designation step to the printing apparatus, wherein (i) in a case that the procedure selection step selects the first job issuing procedure, the transmission step transmits the job without user operation for setting a print condition of the print target image after a designation in the print designation step, and (ii) in a case that the procedure selection step selects the second job issuing procedure, the transmission step transmits the job that includes a print condition that has been set by a user based on the capability information obtained in the obtaining step.

20. The method according to claim 19, wherein in the first job issuing procedure, the job includes information for specifying the image and does not include the print condition.

21. The method according to claim 19, wherein the procedure selection step selects the first job issuing procedure by default.

22. The method according to claim 19, wherein the procedure selection step is operable to select the second job issuing procedure after the job has been generated in the first job issuing procedure.

23. The method according to claim 19, wherein the procedure selection step further selects either the first job issuing procedure or the second job issuing procedure in accordance with a vender name of the printing apparatus.

24. The method according to claim 19, wherein in the first job issuing procedure, the job includes information for specifying the image and includes the print condition that the printing apparatus always supports.

\* \* \* \* \*